(12) United States Patent
Ha et al.

(10) Patent No.: US 11,740,097 B2
(45) Date of Patent: Aug. 29, 2023

(54) METHOD, DEVICE AND SYSTEM FOR MANAGING SMELL SENSIBILITY BASED ON ROUTE OF MOVING OBJECT

(71) Applicants: Hyundai Motor Company, Seoul (KR); Kia Corporation, Seoul (KR)

(72) Inventors: Jae Jun Ha, Hwaseong-si (KR); Young Jun Moon, Sejong-si (KR); Tae Hee Lee, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 44 days.

(21) Appl. No.: 17/408,712

(22) Filed: Aug. 23, 2021

(65) Prior Publication Data
US 2022/0057220 A1  Feb. 24, 2022

(30) Foreign Application Priority Data

Aug. 24, 2020 (KR) .................. 10-2020-0106496
Jun. 4, 2021 (KR) .................. 10-2021-0072881

(51) Int. Cl.
  *G01C 21/34* (2006.01)
  *G01C 21/36* (2006.01)
  *G06N 20/00* (2019.01)

(52) U.S. Cl.
  CPC ..... *G01C 21/3461* (2013.01); *G01C 21/3484* (2013.01); *G01C 21/3617* (2013.01); *G06N 20/00* (2019.01)

(58) Field of Classification Search
  CPC ............ G01C 21/3461; G01C 21/3484; G01C 21/3617; G06N 20/00
  See application file for complete search history.

(56) References Cited

U.S. PATENT DOCUMENTS

| | | | | |
|---|---|---|---|---|
| 2004/0016287 | A1* | 1/2004 | Fu | G01N 33/0031 73/24.06 |
| 2015/0308993 | A1* | 10/2015 | Fukui | G01N 33/0034 29/428 |
| 2020/0132484 | A1* | 4/2020 | Akselrod | G01C 21/3461 |
| 2022/0343184 | A1* | 10/2022 | Yamada | G06F 16/906 |

FOREIGN PATENT DOCUMENTS

| | | | |
|---|---|---|---|
| DE | 102015211776 A1 | * 12/2016 | |
| WO | WO-2018208297 A1 | * 11/2018 | ........... G05D 1/0297 |
| WO | WO-2019074526 A1 | * 4/2019 | ............... A61L 9/01 |

OTHER PUBLICATIONS

DE_102015211776_A1_machine_translation (Year: 2016).*
DE_102015211776_A1_machine_translation (Year: 2015).*

* cited by examiner

*Primary Examiner* — Anne Marie Antonucci
*Assistant Examiner* — Patrick M Brady
(74) *Attorney, Agent, or Firm* — Slater Matsil, LLP

(57) ABSTRACT

A method of managing smell sensibility according to a route of a moving object includes checking a planned travel route of the moving object, determining whether a bad-smell area is included in the planned travel route, determining whether a bad-smell level of the bad-smell area is equal to or greater than an unpleasantness level of a user of the moving object when the bad-smell area is included, and performing a suppression process for blocking introduction of a bad smell into the moving object when the bad-smell level is equal to or greater than the unpleasantness level of the user and maintaining the planned travel route when the bad-smell level is less than the unpleasantness level of the user.

20 Claims, 17 Drawing Sheets

| INQUIRY | Passage POINT (MOVEMENT ROUTE) | UNPLEASANTNESS LEVEL | SMELL TYPE | CALCULATION OF SMELL SENSIBILITY PATTERN ACCORDING TO SMELL ANALYSIS |
|---|---|---|---|---|
| USER A | - | MEDIUM | A1 | MAINTENANCE OF SENSITIVITY LEVEL 3 IN STANDARDIZED A1 |
| | S FACTORY | MEDIUM | A2 | ADJUSTMENT OF SENSITIVITY LEVEL 3 IN STANDARDIZED A2 |
| | T WASTEWATER TREATMENT PLANT | MEDIUM | B1 | ADJUSTMENT OF SENSITIVITY LEVEL 3 IN STANDARDIZED B1 |
| | - | HIGH | B2 | SENSITIVITY LEVEL 1 IN STANDARDIZED B2 |
| | ⋮ | ⋮ | ⋮ | ⋮ |

FIG. 7

| USER INFORMATION | SMELL TYPE | UNPLEASANTNESS LEVEL | SMELL SENSIBILITY PATTERN |
|---|---|---|---|
| USER A | A1 | MEDIUM | SENSIBILITY LEVEL 3 In STANDARDIZED A1 |
| | A2 | HIGH | SENSIBILITY LEVEL 2 In STANDARDIZED A2 |
| | B1 | LOW | SENSIBILITY LEVEL 5 In STANDARDIZED B1 |
| | B2 | HIGH | SENSIBILITY LEVEL 1 In STANDARDIZED B2 |
| | ⋮ | ⋮ | ⋮ |

FIG. 12

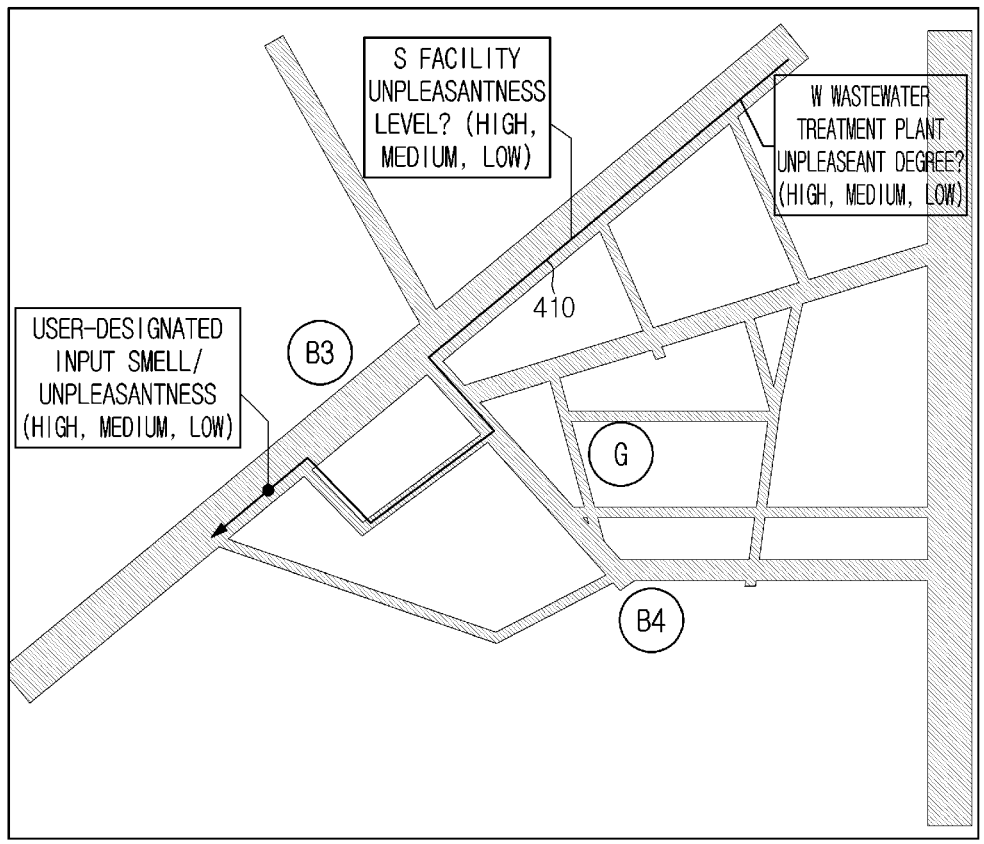

FIG. 13

| INQUIRY | Passage POINT (MOVEMENT ROUTE) | UNPLEASANTNESS LEVEL | SMELL TYPE | CALCULATION OF SMELL SENSIBILITY PATTERN ACCORDING TO SMELL ANALYSIS |
|---|---|---|---|---|
| USER A | - | MEDIUM | A1 | MAINTENANCE OF SENSITIVITY LEVEL 3 IN STANDARDIZED A1 |
| | S FACTORY | MEDIUM | A2 | ADJUSTMENT OF SENSITIVITY LEVEL 3 IN STANDARDIZED A2 |
| | T WASTEWATER TREATMENT PLANT | MEDIUM | B1 | ADJUSTMENT OF SENSITIVITY LEVEL 3 IN STANDARDIZED B1 |
| | - | HIGH | B2 | SENSITIVITY LEVEL 1 IN STANDARDIZED B2 |
| | ⋮ | ⋮ | ⋮ | ⋮ |

METHOD, DEVICE AND SYSTEM FOR MANAGING SMELL SENSIBILITY BASED ON ROUTE OF MOVING OBJECT

CROSS-REFERENCE TO RELATED APPLICATIONS

This application claims the benefit of Korean Patent Application No. 10-2020-0106496, filed on Aug. 24, 2020, and Korean Patent Application No. 10-2021-0072881, filed on Jun. 4, 2021, which applications are hereby incorporated herein by reference.

TECHNICAL FIELD

The present disclosure relates to a method, device and system for managing smell sensibility of a moving object.

BACKGROUND

A smell is derived as a result of mixing various gas components and may be a scent or a bad smell due to a change in the composition ratio of a mixture of gases or a change in the concentration of individual gases. Classifying sensibility into data may be beginning for finding the basic cause of a smell and may be used in various technical fields related to the smell. Since the smell has great influence on the activity and emotion of a person who inhales the smell, a process of determining this may be important.

On the other hand, when a user uses a moving object, there may be various causes of unpleasantness. Among them, there may be a smell introduced from the outside of the moving object. Not only in a personal mobility such as electric kickboards but also in an enclosed vehicle, a bad smell may cause great unpleasantness to users. Moreover, the bad smell may be fatal for users which are very sensitive to the smell or have an allergic reaction, the old and the weak, and children.

Although it is necessary to prevent a bad smell which may cause unpleasantness to a user from entering a moving object in a process of using the moving object, conventionally, the user cannot expect a bad-smell area on a movement route to pass through the bad-smell area or prevent the bad smell from entering through passive methods such as the user closing a window while driving in the bad-smell area. On the other hand, due to the nature of the smell, users react to the smell differently and each user has a different sensibility characteristic for the same smell and smell intensity. However, there is no technology for providing customized control of a moving object based on the smell sensibility characteristics of users having different smell sensitivities.

Considering this, it may be necessary to study technology of giving personalized sensibility to a user for a smell and providing customized control of a moving object to the user based on the same. Hereinafter, a technical method for this will be described.

SUMMARY

The present disclosure relates to a method, device and system for managing smell sensibility of a moving object. Particular embodiments relate to a method, device and system for managing smell sensibility according to a route of a moving object.

An embodiment of the present disclosure provides a method, device and system for managing smell sensibility according to a route of a moving object, which are implemented by a technical computing device of embodiments of the present disclosure.

The technical problems solved by embodiments of the present disclosure are not limited to the above technical problems and other technical problems which are not described herein will be clearly understood by a person (hereinafter referred to as an ordinary technician) having ordinary skill in the technical field, to which the present disclosure belongs, from the following description.

According to an embodiment of the present disclosure, a method of managing smell sensibility according to a route of a moving object includes checking a planned travel route of the moving object, determining whether a bad-smell area is included in the planned travel route, determining whether a bad-smell level of the bad-smell area is equal to or greater than an unpleasantness level of a user of the moving object when the bad-smell area is included in the planned travel route, and performing a suppression process for blocking introduction of a bad smell into the moving object when the bad-smell level is equal to or greater than the unpleasantness level of the user and maintaining the planned travel route when the bad-smell level is less than the unpleasantness level of the user.

According to another embodiment of the present disclosure, the suppression process may include guiding a detour route of the planned travel route or controlling the moving object to suppress the bad smell when passing through the bad-smell area.

According to another embodiment of the present disclosure, the unpleasantness level may be an unpleasantness level of each of a plurality of smells personalized for each user, and the unpleasantness level may be generated based on a smell sensibility pattern composed of a concentration pattern of each component for each of a plurality of smells.

According to another embodiment of the present disclosure, the unpleasantness level may be generated based on a smell sensibility pattern adjusted by a user's sensitivity to each smell, and the smell sensibility pattern may include sensitive smell pattern information of each user calculated by machine learning.

According to another embodiment of the present disclosure, the bad-smell level may be calculated based on smell information and information on a zone affecting a smell of a bad-smell area.

According to another embodiment of the present disclosure, the moving object may include a smell detector, analyze smell information detected through the smell detector, generate smell-related information based on the smell information when the bad-smell level is equal to or greater than a bad-smell threshold, and transmit the smell-related information to at least one of another moving object or a server.

According to another embodiment of the present disclosure, based on smell information collected by a moving object having a first smell detector between the moving object having the first smell detector and a moving object having a second smell detector having lower performance than the first smell detector, the bad-smell area may be designated.

According to another embodiment of the present disclosure, smell information collected by the moving object having the second smell detector may be converted into smell data processed by machine learning based on the smell information obtained from the moving object having the first smell detector, and a smell sensibility pattern of the user may be analyzed based on the smell data or the smell sensibility pattern may be generated based on the smell data.

According to another embodiment of the present disclosure, the moving object having the first smell detector may be assigned to a user who has requested a planned travel route different from that of the moving object having the second smell detector according to at least one of usage pattern information or destination information of a user.

According to another embodiment of the present disclosure, the unpleasantness level may be generated based on a response message to a smell sensibility inquiry before using the moving object, and the response message may include a user's sensitivity to each smell.

According to another embodiment of the present disclosure, the unpleasantness level may be generated based on a response message to a smell sensibility inquiry after starting to use the moving object, and the response message may include a user's sensitivity to each smell.

According to another embodiment of the present disclosure, the smell sensibility inquiry may include at least one of a smell type or a predetermined point of a travel route.

According to another embodiment of the present disclosure, when the response message includes the predetermined point, the unpleasantness level may be generated based on smell information collected or estimated in relation to the predetermined point.

According to another embodiment of the present disclosure, the maintaining the planned travel route when the bad-smell level is less than the unpleasantness level of the user may include controlling the moving object to suppress the bad smell when passing through the bad-smell area according to a selection of the user.

According to another embodiment of the present disclosure, the bad-smell area may include an ordinary bad-smell area and an accidental bad-smell area, the ordinary bad-smell area may have a prestored bad-smell level, and the accidental bad-smell area may be accidentally designated when a bad-smell level based on smell information obtained while the moving object moves is equal to or greater than a bad-smell threshold.

According to another embodiment of the present disclosure, the method may further include determining whether a bad-smell level of the accidental bad-smell area is equal to or greater than an unpleasantness level of a user of the moving object by a moving object, which has obtained the smell information of the accidental bad-smell area, performing the suppression process when the bad-smell level is equal to or greater than the unpleasantness level of the user and maintaining the planned travel route when the bad-smell level is less than the unpleasantness level of the user, and transmitting smell-related information of the accidental bad-smell area to at least one of another moving object or a server.

According to another embodiment of the present disclosure, the method may further include determining whether a noble-fragrance area is included around the planned travel route of the moving object, determining whether a noble-fragrance level of the noble-fragrance area is equal to or greater than a preference of the user of the moving object, when the noble-fragrance area is included, and performing an induction process for introducing noble fragrance into the moving object when the noble-fragrance level of the noble-fragrance area is equal to or greater than the preference of the user and maintaining the planned travel route when the noble-fragrance level is less than the preference of the user.

According to another embodiment of the present disclosure, a moving object for managing smell sensibility according to a route of the moving object includes a transceiver configured to transmit and receive a signal and a processor configured to control the transceiver. The processor is configured to check a planned travel route of the moving object, when a bad-smell area is included in the planned travel route, to determine whether a bad-smell level of the bad-smell area is equal to or greater than an unpleasantness level of a user of the moving object, and to perform a suppression process for blocking introduction of a bad smell into the moving object when the bad-smell level is equal to or greater than the unpleasantness level of the user and to maintain the planned travel route when the bad-smell level is less than the unpleasantness level of the user.

According to another embodiment of the present disclosure, a server for managing smell sensibility according to a route of a moving object includes a transceiver configured to transmit and receive a signal and a processor configured to control the transceiver. The processor is configured to determine whether a bad-smell area is included in a planned travel route of the moving object, to determine whether a bad-smell level of the bad-smell area is equal to or greater than an unpleasantness level of a user of the moving object, when the bad-smell area is included in the planned travel route, and to control setting of the moving object to perform a suppression process for blocking introduction of a bad smell into the moving object when the bad-smell level is equal to or greater than the unpleasantness level of the user and to control setting of the moving object to maintain the planned travel route when the bad-smell level is less than the unpleasantness level of the user.

According to another aspect of the present disclosure, a fleet system implemented by a computing device to perform a smell sensibility management process according to a route of a moving object includes a server configured to manage the fleet system, at least one user device registered in the fleet system, and at least one moving object registered in the fleet system. At least one of the server or the moving object is configured to check a planned travel route of the moving object, when a bad-smell area is included in the planned travel route, to determine whether a bad-smell level of the bad-smell area is equal to or greater than an unpleasantness level of a user of the moving object, and to perform a suppression process for blocking introduction of a bad smell into the moving object when the bad-smell level is equal to or greater than the unpleasantness level of the user and to maintain the planned travel route when the bad-smell level is less than the unpleasantness level of the user.

The features briefly summarized above with respect to embodiments of the present disclosure are merely exemplary aspects of the detailed description below of the present disclosure, and do not limit the scope of the present disclosure.

According to embodiments of the present disclosure, it is possible to provide a method, device and system for managing smell sensibility according to a route of a moving object, which are implemented by a computing device.

It will be appreciated by persons skilled in the art that that the effects that can be achieved through embodiments of the present disclosure are not limited to what has been particularly described hereinabove and other advantages of embodiments of the present disclosure will be more clearly understood from the detailed description.

BRIEF DESCRIPTION OF THE DRAWINGS

FIG. 7 is a view illustrating an individual user's unpleasantness level and smell sensibility pattern.

FIG. 12 is a view illustrating a form of a smell sensibility inquiry after starting to use a moving object.

FIG. 13 is a view illustrating a response message to a smell sensibility inquiry and an updated smell sensibility pattern of an individual user.

DETAILED DESCRIPTION OF ILLUSTRATIVE EMBODIMENTS

Figure 1:
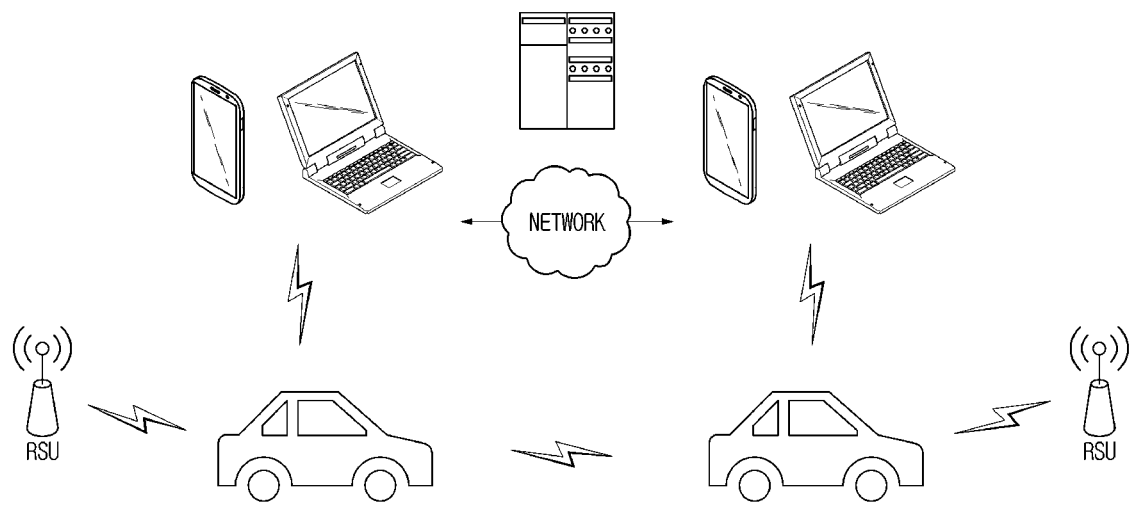
FIG. 1 is a view illustrating a moving object performing communication with another device through a network.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In embodiments of the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In em embodiments of the present disclosure, the terms first, second, etc. are only used to distinguish one element from another and do not limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In embodiments of the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In embodiments of the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of embodiments of the present invention and the way of attaining them will become apparent with reference to embodiments described below in detail in conjunction with the accompanying drawings. Embodiments, however, may be embodied in many different forms and should not be constructed as being limited to example embodiments set forth herein. Rather, these embodiments are provided so that this disclosure will be complete and will fully convey the scope of the invention to those skilled in the art.

FIG. 1 is a view illustrating a moving object performing communication with another device through a network.

Referring to FIG. 1, the moving object may perform communication with another moving object or another device. For example, the moving object may perform communication with another moving object or another device based on cellular communication, WAVE communication, dedicated short range communication (DSRC) or another communication method. That is, as the cellular communication network, a communication network such as LTE or 5G, a Wi-Fi communication network, a WAVE communication network, etc. may be used. In addition, a short-range communication network used in a moving object, such as DSRC, may be used, but the present disclosure is not limited to the above-described embodiment.

In addition, for example, in relation to communication of the moving object, for security of the moving object, a module capable of performing communication with a device located inside the moving object and a module capable of performing communication with a device located outside the moving object may be separately provided. For example, in a moving object, communication with only a device in a predetermined range of the moving object, such as Wi-Fi communication, may be performed based on security. For example, the moving object and the personal device of the driver of the moving object may include communication modules for performing communication between each other. That is, the moving object and the personal device of the driver of the moving object may use a communication network blocked from an external communication network. In addition, for example, the moving object may include a communication module for performing communication with an external device. In addition, for example, the above-described modules may be implemented as one module. That is, based on one module, the moving object may perform communication with another device, but the present disclosure is not limited to the above-described embodiments. That is, in the moving object, a communication method may be implemented based on various methods, but the present disclosure is not limited to the above-described embodiments.

In this case, the moving object may refer to a movable device, for example. For example, the moving object may include a vehicle (including an autonomous vehicle or an automated vehicle), a drone, personal mobility, a mobile office, a mobile hotel or a personal air vehicle (PAV). The personal mobility may include, for example, a moving object including at least three wheels for stable independent traveling or a moving object which has one or two wheels but can be driven independently while maintaining balance (e.g., a single-wheel Segway, a two-wheel Segway, an electric kickboard, etc.). The personal mobility may use electricity using a battery as a power source, but is not limited thereto and may use any type of power source capable of moving the mobility. For example, the personal mobility may mean a means of transportation in which only one user rides or a means used by only one user. In addition, the personal mobility may mean a small means of transportation which may be used by a small number of users. For example, the personal mobility may include not only a single-wheel Segway, a two-wheel Segway and an electric kickboard but also an electric wheelchair, an electric bicycle and an electric two-wheeled vehicle. In addition, the moving object may include the other moving devices and is not limited to the above-described embodiments.

Figure 2:
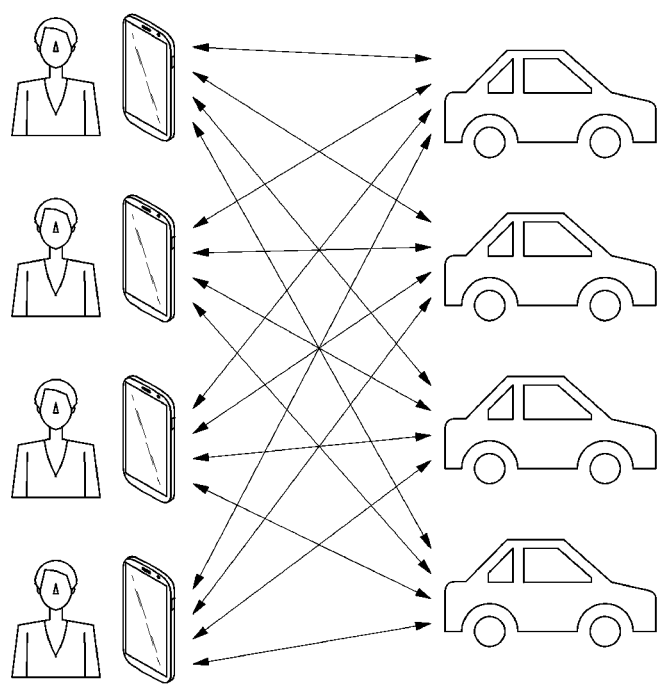
FIG. 2 is a view illustrating sharing a moving object based on a fleet system.

FIG. 2 is a view illustrating sharing a moving object based on a fleet system.

For example, a fleet system may be applied to provide a moving object sharing service. The fleet system may be operated by data generation, processing and exchanging between computing devices. The fleet system may include, for example, at least one server, a plurality of user devices and a plurality of moving objects. The server may process a request of a user device, transmit a response message, process a reservation, assignment/return of a moving object according to the request, and manage the moving object, for a fleet service. In addition, when there is a bad-smell or noble-fragrance area on a planned travel route, the moving object may perform handling for suppressing or introducing the smell of the area, and the server may perform overall management of smell sensibility according to a route of the moving object, by supporting the handling and controlling settings of the moving object.

In addition, the fleet system may include a plurality of devices and a plurality of moving objects. In addition, for example, the fleet system may further include a road side unit (RSU), etc. The device may include a smartphone, a smart pad, a smart watch, etc. As another example, the device may mean a device capable of exchanging signals through the other communication, but is not limited to the above-described embodiment. However, hereinafter, for convenience of description, this is referred to as a device or a user device. In addition, for example, the moving object may be a vehicle. In addition, for example, the moving object may be an object moving in a provided area such as a rail. As another example, the moving object may be a flying object such as a drone. That is, the moving object may refer to a movable object and may mean a moving object shared based on the fleet system. However, although the vehicle will be described below for convenience of description, this is equally applicable to the other moving objects. As another example, the RSU is a road side unit and may be a device capable of performing communication. In addition, for example, the RSU may refer to a structure installed to transmit and receive signals to a building or another area and is not limited to the above-described embodiment. However, hereinafter, this will be collectively referred to as the RSU for convenience of description and may be various structures or devices and is not limited to the above-described embodiment.

In addition, the fleet system may be a moving object sharing system. The fleet system may be a system in which a moving object is shared in a predetermined area. The predetermined area may have the local concept such as apartment complex or a work area. For example, the predetermined area may be an area in an apartment complex or an area separated from the apartment complex by a preset distance. As another example, the predetermined area may mean an area separated from a work area by a preset distance. As another example, an area to which the fleet system applies may be a larger area or a city unit, such as an administrative district, and is not limited to the above-described embodiment. That is, the predetermined area may mean a reference range in which operation based on the fleet system is possible, and may be changed by a user or a system. In addition, for example, the fleet system may be a system in which the moving object is shared by users authenticated as specific users (or devices). For example, the specific user may be a resident of an apartment in a predetermined range in which the service of the fleet system may be provided or a worker of an office located in a specific area. For example, the specific user may be a person subscribing to the fleet system providable in a predetermined service area and may be a user outside the service area. Such a user may try to approach a certain service area to use a sharing service. For example, the fleet system may provide the moving object sharing service based on a device registered by the resident of the apartment or the worker of the office. Therefore, it is possible to provide the sharing service to only the specific target and to increase moving object security and management efficiency. However, the specific user who uses the shared moving object in the fleet system may be determined based on another method, and is not limited to the above-described embodiment.

The shared moving object fleet system may be provided with a shared moving object. The shared moving object may be a moving object authorized or authenticated to be shared by the system. For example, the shared moving object may be a moving object registered in the fleet system. A fleet system administrator may provide the shared moving object for the fleet system. That is, only the moving object authorized or authenticated by the fleet system administrator may be used as the shared moving object. Therefore, it is possible to prevent accidents which may occur due to security or management of the shared moving object in the fleet system. More specifically, the moving object to be shared may be registered in the fleet system. The right to register the shared moving object in the fleet system may be restricted by the fleet system. The moving object which may be registered in the fleet system may have the same ID or the same identification information. In addition, since the fleet system provides the shared moving object, the shared moving object may be managed. For example, management of the shared moving object may be information necessary to provide a shared moving object service, such as residual oil information of the moving object registered in the fleet system, moving object status information or moving object operation information. The fleet system may check the status of the shared moving object in real time, control authority for use or transmit a command for maintenance through the system with respect to a moving object in which a problem has occurred and provide a service based on this.

As another example, the fleet system may provide a mixture of a shared moving object and a private moving object. For example, the fleet system may set identification information for identifying the shared moving object provided by the system and the private moving object, for example, a moving object possession indication field. When a value other than the private moving object is recorded in the indication field, the shared moving object may be indicated as a moving object provided by a system provider without private possession. On the other hand, when a value indicating the private moving object is recorded in the indication field, this may indicate that the moving object is privately possessed and the moving object is provided to the fleet system as the shared moving object. The case where the private moving object and the shared moving object provided by the system are mixed may also be considered. For example, the service provided by the fleet system may vary based on the moving object possession indication field. For example, in the case of the moving object provided by the fleet system, there may be no restriction on the use of a user who uses the moving object. On the other hand, in the case of the private shared moving object, there may be use restriction. As another example, the fleet system moving object and the private shared moving object may provide services based on different charging systems, and is not limited to the above-described embodiment.

As another example, in relation to the detailed operation of the fleet system, a service may be provided based on a device registered in the fleet system.

More specifically, the device registered in the fleet system may obtain information on the shared moving object after an authentication and security procedure with the system. That is, the device may be provided with the information on the shared moving object. The device may be brought into contact with the moving object to be used based on the information on the shared moving object.

For example, there may be a registered moving object or a registered device (or user) in the fleet system. That is, only a specific moving object and device may be registered in the fleet system based on authentication and authorization. In this case, the fleet system may be operated based on the status information of the registered moving object and the registered device. For example, the fleet system may check information on a moving object which is currently being used and position information of an individual moving object in real time. For example, each moving object may periodically transmit information thereof to the fleet system. In addition, for example, each moving object may transmit information thereof to the fleet system based on an event trigger. For example, when an event in which the position of the moving object is changed or whether to use the moving object is changed is triggered, the moving object may transmit information thereof to the fleet system (or the server). In addition, the fleet system (or the server) may check information on the registered device in real time. For example, the registered device may not always use the service of the fleet system. Accordingly, activation information indicating whether the registered device uses the service of the fleet system may be necessary. For example, the fleet system may include information on a list of registered devices. A device which is currently using the moving object or activates the system for use of the moving object among the registered devices included in the list of the fleet system may be provided together with the list information. As another example, a registered device (deactivated device) which does not use the fleet system, a registered device (activated device) which is using the moving object of the fleet system and a registered device (temporary device) which wants to use the moving object may be distinguishably displayed. That is, information on whether the moving object is actually being used, whether there is no intention of using the moving object or whether there is an intention of using the moving object but the moving object is not yet used may be provided. In addition, for example, usage state information may be further indicated with respect to the device which is using the moving object of the fleet system. For example, the usage state information may further include expected use time information or use position information.

More specifically, the fleet system may include list information of a plurality of registered moving objects and a plurality of devices. In this case, the list information may include at least one of usage state information, device position information or moving object position information. In this case, the fleet system may provide a moving object sharing service based on the device position information and the moving object position information.

In addition, the usage state information may include at least one of information on a moving object in use, expected time information of a moving object in use, device-moving object matching information, deactivated device information, activated device information, activated moving object information or deactivated moving object information. In this case, for example, the usage state information may further include information on a moving object currently used by another device and expected time information of a moving object in use. In addition, the usage state information may further include device-moving object matching information based on information in the form of a list. In addition, the usage state information may include activated device information and deactivated device information. For example, the activated device information may be a device which is currently using the moving object or a device which is preparing for using the moving object among devices registered in the fleet system, as described above. For example, the activated device may mean a device which has executed a program or application for the fleet system. Meanwhile, the deactivated device may be a device which is registered in the fleet system but does not use sharing of the moving object. For example, the deactivated device may be a device which did not execute or deactivate the program or application for the fleet system.

In addition, the fleet system may include activated moving object information and deactivated moving object information. In this case, for example, the fleet system may include status information of a plurality of moving objects. In this case, the status information of the moving object may be information on whether the moving object is normal or abnormal or information on the moving object such as remaining traveling distance information or refueling time information. That is, the status information of the moving object may be information for determining whether the moving object may be provided for sharing of the moving object, and is not limited to the above-described embodiment. In this case, the fleet system may determine whether the moving object is activated based on the status information. For example, the fleet system may classify a moving object which is in a normal state and has a sufficient amount of oil as an activated moving object and provide information. On the other hand, the fleet system may classify a moving object which is in an abnormal state as a deactivated moving object. In this case, the fleet system may provide information on the deactivated moving object to an associated system or server. For example, the associated system or server may perform repair or management with respect to the deactivated moving object, and is not limited to the above-described embodiment.

In addition, for example, the fleet system may classify a moving object having a predetermined amount of oil or less as a deactivated moving object. As another example, when a moving object having a predetermined amount of oil or less is shared through a device, the fleet system may provide information on the amount of oil to a device user through a notification. In addition, for example, the fleet system may provide information on an associated designated system (e.g., a gas station of a particular brand) to a user and provide information indicating that refueling is required. In this case, the fleet system may exchange charging or other necessary information with the associated designated system regardless of the user and provide a service based on this.

That is, a user who uses a moving object sharing system may refuel at a designated place without paying a fee and handle the fee through a system linked to the fleet system. Meanwhile, for example, as described above, a device (temporary device) which wants to use the moving object may use the moving object by checking the fleet system.

For example, the device may be assigned a moving object to be used through the fleet system. In this case, for example, the fleet system or the server may assign the moving object to the device using at least one of moving object overview information, information on a moving object in use, position information of the moving object or position information of the device. Meanwhile, for example, the fleet system may provide information on failure to the device when the moving object cannot be assigned. In addition, for example, the fleet system may assign only a moving object within a certain distance based on the position of the device, and is not limited to the above-described embodiment. Next, the device may approach the moving object within a certain distance. In this case, the device may transmit an authentication signal to the moving object. In addition, for example, the device may use the shared moving object through a tag on the shared moving object based on a list of available moving objects. For example, the device may perform tagging with respect to the moving object based on magnetics such as NFC, Bluetooth or transportation card. In this case, when the device is tagged, the shared moving object may perform an authentication procedure from the fleet system such that the device provides the moving object. For example, when authentication is completed based on the device tag, the door of the moving object may be opened.

In relation to a detailed authentication operation, when the device approaches the moving object within a certain distance, an authentication signal may be transmitted to the moving object. In this case, communication which may be used by the moving object and the device may be Bluetooth, NFC or a tag as described above. That is, an authentication procedure may be performed under a certain condition, and is not limited to the above-described embodiment. When the device approaches the moving object or performs tagging, the moving object and the device may determine whether the device can use the moving object through signal exchange and perform authentication. In this case, the device may transmit an authentication signal including identification information thereof and identification information of a group, to which the device belongs, to the moving object. In this case, the moving object may determine whether the device is registered in the fleet system based on the identification information of the device included in the received authentication signal. In addition, the moving object may determine whether the device is included in a group, to which a service is capable of being provided by the moving object, based on the identification information of the group included in the authentication signal. That is, the moving object may determine whether the device may use the moving object based on device identification information and group identification information. For example, when the device may not use the moving object, the moving object may transmit information indicating that the device is unavailable. For example, the device may obtain information indicating unavailability from an application or other service provision program.

Meanwhile, when the device may use the moving object, the moving object may transmit a signal for a request to perform an authentication procedure to the device. That is, when the device is legally registered in the fleet system (or the server) and the moving object may also legally operate based on the fleet system, the moving object may transmit the signal for the request to perform the authentication procedure to the device. In this case, the moving object may transmit the signal for the request to perform an authentication procedure, including identification information thereof and encryption key information, to the device. For example, both the identification information of the moving object and the device information may be registered in the fleet system. In this case, the moving object may transmit a signal including the identification information of the moving object, the identification information of the device and the encryption key information to the fleet system.

In addition, the device may also transmit, to the fleet system, a signal including the identification information of the moving object, the encryption key information and the identification information thereof included in the signal for the request to perform the authentication procedure.

Thereafter, the fleet system may compare the signal received from the moving object and information included in the signal received from the device. In this case, when all the identification information of the moving object, the identification information of the device and the encryption key information are the same, the fleet system may recognize that the device may use the moving object. Thereafter, the fleet system may transmit authentication confirmation information to the moving object and the device. In this case, the fleet system may register information indicating that the device uses the moving object in a database. In addition, for example, a time when the device uses the moving object and additional information may also be continuously transmitted.

In addition, the moving object may register the device based on the authentication confirmation information and the door of the moving object may be opened. In addition, a lock for using the moving object may be unlocked to allow the device to control the moving object.

In this case, for example, when the above-described authentication is completed, the moving object and the device may periodically exchange signals. That is, while the device uses the moving object, the moving object may continuously confirm use through periodic signal exchange with the device.

Figure 3:
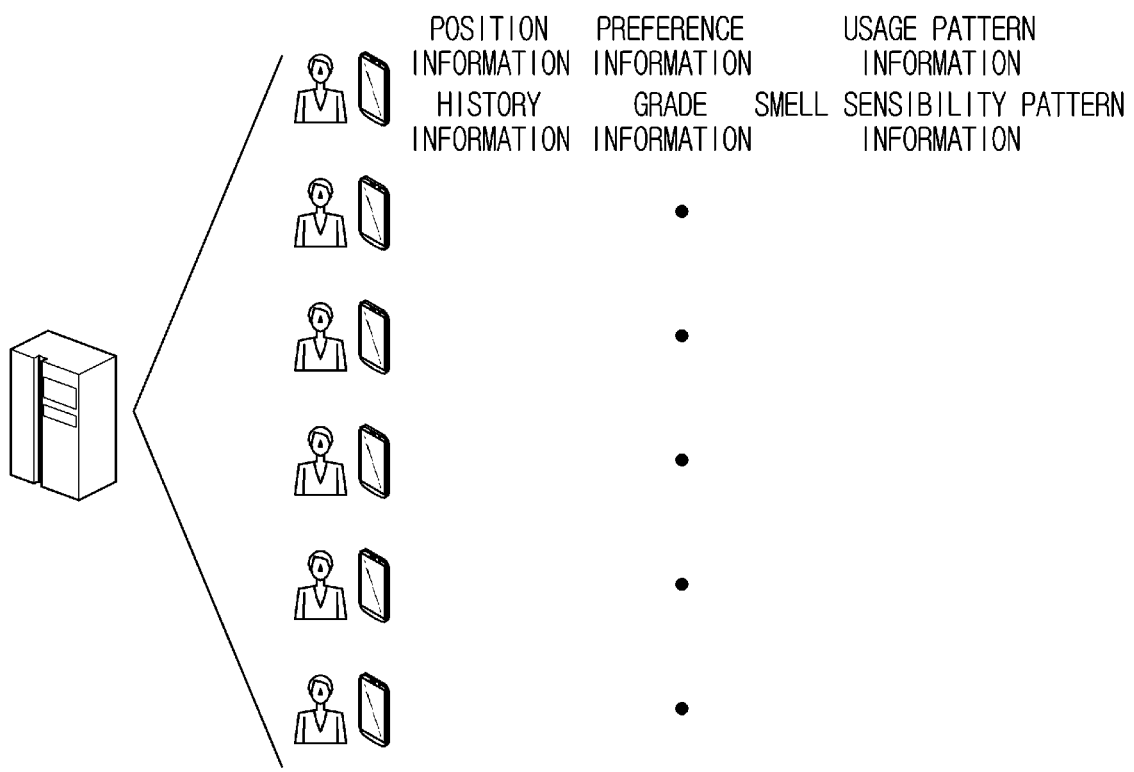
FIG. 3 is a view illustrating managing a user based on a fleet system.

FIG. 3 is a view illustrating managing a user based on a fleet system.

For example, based on the above description, the moving object and the device may be managed in the fleet system. In this case, for example, in the fleet system, information on each user may be managed. For example, information on each user may be information on user usage based on a user ID or a user identification device. As a more specific example, information on each user may include at least one of user position information, user history information, preference information, usage status information, grade information or usage pattern information.

For example, the user position information may be information for checking a mainly used route of a user who uses the fleet system. For example, the user position information may be static position information set by a user, such as a user's residence and work place and dynamic position information such as position information at the time of request for use and position information at the time of use. In addition, for example, the fleet system may store user history information.

The history information may be user tendency information analyzed based on the type of the moving object used by the user, an area of use of a fleet spot provided to the fleet system, a moving route, a destination point, or a parking point during use. For example, the fleet system may perform recommendation for use of the moving object based on the user history information. In addition, for example, the fleet system may perform management for moving object assignment and distribution using the history information of a plurality of users.

In addition, for example, the fleet system may include user preference information. For example, the user preference information may be information considering the frequency or preference of the used moving object. Specifically, the preference information may be the type of the moving object which is designated or estimated to be preferred by the user. In addition, for example, the user preference information may be input by a user, and is not limited to the above-described embodiment.

In addition, for example, the fleet system may provide the grade information of the user. The grade information may be given to each user based on use situation information including subscription information of the fleet system and usage result information and evaluation information after using the moving object. For example, the subscription information may be related to whether a user makes a long-term contract or subscribes to a premium membership as a contract condition for the service of the fleet system. The usage result information may include a frequency of using the moving object, use cost according to a time or distance, etc. When the user frequently uses the moving object, the grade level may increase. For example, the evaluation information may be generated based on the clean state after using the moving object, maintenance occurrence due to accidents and inappropriate use of the moving object, rapid increase in consumption of moving object parts due to a user's inappropriate use such as sudden stop/overspeed. The evaluation information may be calculated or estimated by a subsequent user, a maintenance center after return or the above-factors of various sensors mounted in the moving object during/after use. In addition, in the evaluation information, when the subsequent user or an administrator determines inappropriate use due to a user's smoking or behavior causing a bad smell or when such a determination is accumulated, the grade level may decrease. In addition, in the evaluation information, when the moving object is used without an accident or is continuously used well so that unnecessary maintenance does not occur, the grade level may increase. The evaluation information may be created for each user based on the usage status information of the moving object generated from the used moving object and the server.

In addition, the fleet system may provide usage pattern information of the user. The usage pattern information may be generated by collecting at least one of life pattern information or riding pattern information of each user. For example, the life pattern information may be generated based on at least one of consumption information of the user, a destination point when the moving object was used in the past or a stopping point when the moving object was used in the past. The riding pattern information may be configured based on at least one of the use area and parking surface of the moving object, the average number of passengers of the moving object, the age and gender of the passenger or passenger body information. The fleet system may determine at least one zone suitable for the user in the large-area fleet spot in consideration of the usage pattern information and assign a moving object disposed in the zone. In addition, the fleet system may analyze the usage pattern information, determine an optimal parking surface according to the usage pattern of the user and the zone of the fleet spot, to which the moving object will be returned, and notify the user of it when the moving object is reserved.

In addition, the fleet system may provide each user with smell sensibility pattern information and an unpleasantness level and preference of each of a plurality of smell types. The smell sensibility pattern information may be configured in a concentration pattern of each component for each of a plurality of smells. Specifically, the smell sensibility pattern information may be calculated by performing machine learning with respect to the concentration pattern of each smell component, and machine learning may check smell pattern information indicating whether an individual user feels displeasure or noble fragrance and generate smell sensibility pattern information customized for each user. Noble fragrance may be a smell recognized by an individual user as a good smell. Unpleasantness level may be unpleasantness index data calculated based on the smell sensibility pattern in which the user feels displeasure, and the preference may be preference index data calculated based on the smell sensibility pattern in which the user feels noble fragrance. As time elapses, a user's sensitivity to each smell may vary and the smell sensibility pattern information and unpleasantness level and preference may vary based on the varying sensitivity. Accordingly, the smell sensibility pattern information, unpleasantness level and preference may be updated. In addition, the smell sensibility pattern information may be, for example, managed for each user who directly controls operation of the moving object. Preference and unpleasantness level may be set and updated for each user, because unpleasantness level and preference differ between users even in the case of the same smell and the smell that the user feels displeasure with may be changed to a smell which causes the user to feel noble fragrance over time. Specifically, the smell of burning grass, the smell of burning straw and the smell of phytoncide may have different sensibility for each user. In addition, although the user had unpleasantness with respect to the smell of burning grass or straw in the past, by inputting preference, that is, noble fragrance, in a similar smell sensibility inquiry shown in FIG. 13 later, the user may have noble fragrance and thus the smell sensibility of the user for these smells may be changed. Therefore, the sensibility pattern information of the smells may be classified and analyzed to be changed from unpleasantness to preference. When an area with a smell having noble fragrance is included in a traveling route, a process of introducing the noble fragrance may be controlled to be performed by the moving object, instead of preventing a bad smell from being introduced.

As another example, the smell sensibility pattern information may be managed for each extended user including a passenger. As another example, the smell sensibility pattern information may be managed by grouping a user who controls driving and an extended user who frequently rides with the user. In this case, a user's request for use of the moving object may include the extended user to ride, and the fleet system may control the moving object to handle an external smell in consideration of the smell sensibility pattern information of the user who controls driving and the extended user. The smell sensibility pattern information will be described in detail with reference to FIGS. 8 to 14.

The above-described various information may be stored in and managed by a server for controlling the fleet system, for example. As another example, at least some of the information may be stored in an identification device mounted in or tagged on the moving object or a user device which may communicate with the moving object. The identification device may be used to identify and authenticate the user who makes a reservation when the user uses the assigned moving object. The identification device may transmit data for control of the moving object to the moving object and the fleet system (server) in addition to the purpose for authentication. For example, the identification device may store the grade information of the user and apply benefit information and penalty information (hereinafter referred to as benefit and penalty) according to the grade level of the user to control of the moving object. In addition, the identification device may detect a user's inappropriate use through a sensor mounted in the moving object, store and transmit evaluation information determined in real time to the server, and enable the server to update the evaluation information. In addition, the identification device may collect and transmit life pattern information such as real-time movement route, a destination point and a stopping point of the moving object to the server and enable the server to update the life pattern information or to change a return zone and a parking surface designated at the time of reservation. In addition, the identification device may obtain riding pattern information different from that at the time of reservation, transmit it to the server, and enable the server to update the riding pattern information or to change the return zone and the parking surface designated at the time of reservation. The identification device or the user device may store the smell sensibility pattern information of the user and use it to control the moving object through signal exchange with the moving object. In addition, when there is a passenger, the passenger may connect the user device or the identification device thereof with the moving object for data exchange, such that the moving object may receive the smell sensibility pattern information of the passenger (extended user). As another example, when the smell sensibility pattern information is managed by grouping the user and the extended user, the identification device or the user device of the user who controls driving may transmit the smell sensibility pattern information of the extended user who has ridden to the moving object.

Figure 4:
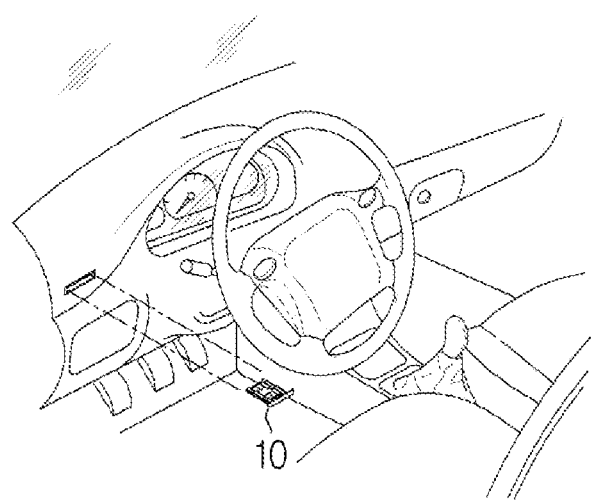
FIG. 4 is a view illustrating an example of applying an identification device to a moving object.

The form of the identification device is shown in FIG. 4. FIG. 4 is a view illustrating an example of applying an identification device to a moving object.

The identification device 10 may have at least one of functions for identifying a user, a control target or a service target. In addition, for example, the identification device 10 may have an ID function. In addition, the identification device may be at least one of a smart device, a smart module, a user identification module or an identification module. That is, the identification device may be a hardware component. In addition, the identification device is a software component and may be used for identification. At this time, for example, the identification device 10 may be a SIM (Subscriber Identity Module). For example, the SIM applied to the moving object as the identification device 10 may include at least one of a Mobility SIM (M-SIM) or a Vehicle SIM (V-SIM). In addition, for example, the identification device may be equal to or compatible with the existing SIM, and is not limited to the above-described embodiment.

As described above, the identification device may be applied to the moving object in consideration of the case where the moving object performs communication with an external device. For example, a universal subscriber identification module (USIM) may is installed in a user device phone, such that a user is recognized through the USIM to provide a service. The moving object may have an identification device card installed therein based on the above description. For example, the identification device applied to the moving object may be referred to as a Vehicle SIM (VSIM). That is, a new type of the identification device is applicable as the identification device applied to the moving object. For example, the VSIM may be compatible with the USIM or another SIM. In addition, the VSIM may further provide another service in consideration of the characteristics of the moving object, and is not limited to the above-described embodiment.

As shown in FIG. 4, there may be a part, to which the identification device 10 is applied, in the moving object. At this time, FIG. 4 shows one example of applying the identification device 10, and is not limited to the above-described embodiment. More specifically, as shown in FIG. 4, there may be a part, to which the identification device is applied, in a visually identified part of the driver's seat of the moving object. Although not shown, as another example, the identification device may be applied to the glove box located at the passenger's seat of the moving object. As another example, the identification device may be inserted into a part in which the display of the moving object is present, but this is not limited to the above-described embodiment, and there may be a slot, in which the identification device may be accommodated, at an appropriate part inside or outside the moving object. As another example, in consideration of portability of the identification device, the identification device may be implemented in combination with a tool key or a car key. That is, the identification device may be mounted in the tool key or the car key, and the identification device detached from the car key may be mounted in the moving object to be used. The tool key or the car key may perform communication with the moving object through short-range communication (e.g., Bluetooth, beacon or NFC). Therefore, message exchange may be performed and identification may be performed. That is, the car key or tool key reflecting uniqueness of an individual may be used as the identification device, and is not limited to the above-described embodiment.

As another example, the above-described identification device may be mounted through an existing device mounted in the moving object. For example, the existing device (e.g. a road payment terminal or black box) may be already installed in the moving object. As another example, the identification device may be recognized through an existing terminal (e.g., a USB port or a cigarette jack) included in the moving object.

As another example, the identification device is applicable to any position in a range in which authentication is possible in the moving object, and the identification device may be integrally or detachably applicable to a control unit, communication unit or part of the moving object.

Figure 5:
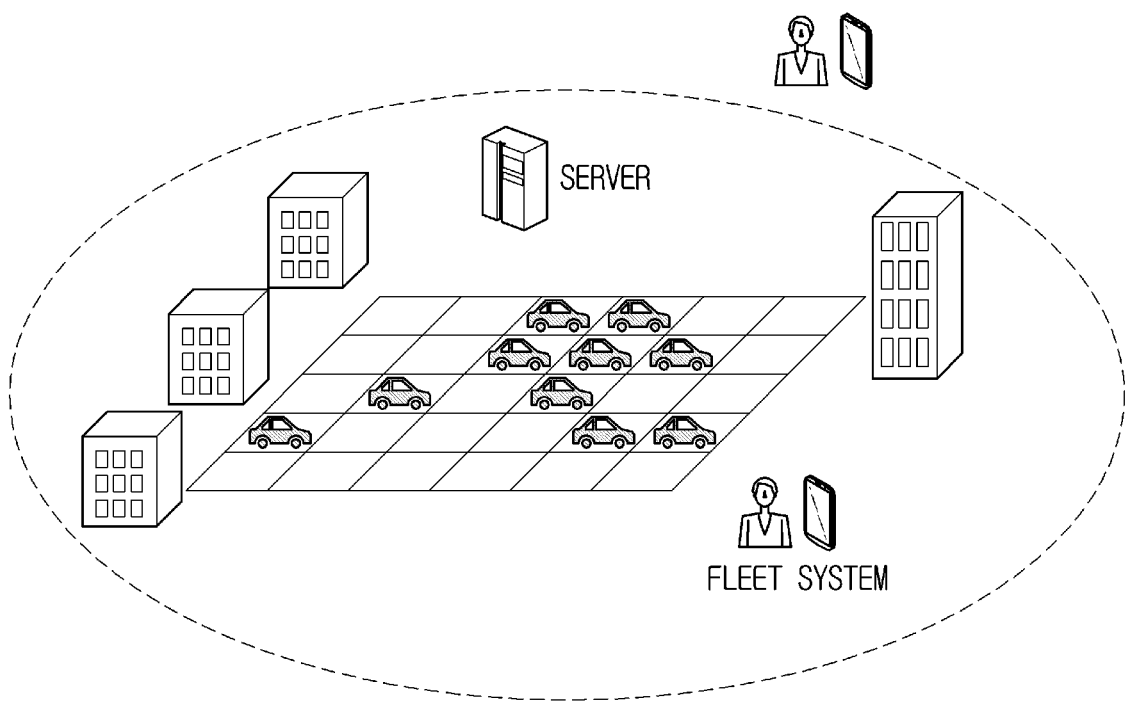
FIG. 5 is a view illustrating an example of a fleet spot.

FIG. 5 is a view illustrating an example of a fleet spot.

The fleet system may be operated with a fleet space where a shared moving object is capable of being assigned or returned. The fleet space may be an area where the shared moving object is stored in a predetermined area to provide a service. For example, the predetermined area may be located near an area where residential districts and/or commercial districts are concentrated. This is to increase convenience of the service provided by the fleet system to people who use buildings near the residential and/or commercial buildings accommodating a large number of people or with a large floating population. People who may use the fleet system may include not only people who reside in the buildings but also people who use the fleet system for a variety of purposes, such as people who visit an area around the fleet space or transfer to another moving object through the fleet space.

The fleet system according to embodiments of the present disclosure may be operated with a small number of moving objects or a large number of moving objects for service expansion and convenience through the fleet system. When being operated with a large number of moving objects, the fleet space may have a large area in order to accommodate various kinds of moving objects. When the fleet space is operated as a large-area space, a plurality of moving objects may be disposed to be uniformly accommodated in the large space and may be disposed in consideration of the buildings around the fleet spot, the number of resident people or a floating population. Therefore, the fleet space may be partitioned into a plurality of zones in order to efficiently manage the plurality of moving objects. Each zone may be assigned an accommodation area and a parking surface in consideration of information on the vicinity of the zone, such as the buildings around the fleet spot, the number of resident people or a floating population.

As another example, a maintenance or inspection zone may be disposed in the zones of the fleet space. For example, when there is no reservation for a moving object to be returned for a predetermined time and the fleet system determines that inspection of the moving object is necessary or when the fleet system determines that urgent maintenance is required based on the moving object status information although there is a next reservation, the fleet system may induce the user of the moving object to return the moving object to the maintenance zone instead of the return zone. As another example, when the fleet system determines that maintenance of an unused moving object parked in a non-maintenance zone is required, the fleet system may move the moving object to a pre-designated zone in an unmanned or manned manner. At this time, the pre-designated maintenance zone may be a place where maintenance and management of the moving object are performed, such as a moving object repair shop, a car wash or a moving object interior cleaning company.

As another example, the fleet system may manage the moving objects by grouping them in a predetermined number of units. In addition, the fleet system may perform maintenance and management of the moving object in group units. In the above-described example, when the maintenance zone is a repair shop or a car wash, a designated area (a repair shop, a car wash, a vehicle interior cleaning company, etc.) for maintenance and management of the moving object for each moving object group may be set. That is, when maintenance and management of the moving object are required, the fleet system may move the moving object to the designated area for each group in a manned or unmanned manner such that maintenance and management of the moving object are performed. By performing maintenance and management of the moving object for each moving object group, it is possible to perform maintenance and inspection of a larger number of moving objects within a limited time.

As another example, in the fleet system, a support unit for maintenance and management of the moving object may be disposed for each moving object group, such that maintenance and inspection of the moving object may be rapidly performed during inspection. For example, the support unit may be a maintenance vehicle disposed for maintenance and management of the moving object.

The fleet system may be, for example, operated, such that a central server manages moving object assignment/return state, moving object status information related to a position and usage state, zone rearrangement of the moving object for each zone and processes a variety of information for each user. As another example, in the fleet system, a slave system in charge of each zone may be disposed to process and manage a task related to the moving object and to receive a user's request for use, such that tasks until a moving object of a specific zone is assigned and a variety of information on each user are managed by the central master server. The master server may receive the result of processing the task related to the moving object using the slave system and update information on each user. Hereinafter, although, for convenience of description, the central server processes information on each moving object and user and manages all zones, such processing may be performed in the master server and the slave system.

In principle, the fleet system is operated such that the moving object is rented in the fleet space and is returned in the corresponding zone, but may be flexibly operated such that the moving object is returned to a space other than the corresponding space according to user grade information or usage pattern information. In addition, the fleet system may allow return to a heterogeneous fleet system in consideration of a premium service type used by a user, a temporary request and grade information.

The zones of the fleet space may be provided on the ground or may be set on each floor of a multi-story building facility or in a plurality of areas defined for each floor in order to increase the usability of the ground.

Hereinafter, setting of control of the moving object such that a fleet system implemented by a computing device may execute a process corresponding to a bad-smell area or noble-fragrance area on a planned travel route based on smell sensibility pattern information personalized for each user will be described.

The fleet system may include an application or program for implementing a series of processes for executing the above process, which is collectively referred to as an application for convenience of description. The application may perform a process based on requests and data transmitted among a user device, a shared moving object and a server. Such an application may be installed in all of the user device, the shared moving object and the server, such that the server obtains information generated from each computing device to perform the process. Hereinafter, although, for convenience of description, the moving object mainly performs the process, for example, in order to efficiently use a memory space of the moving object and reduce the computational burden of the processor, at least some of the operations included in the process may be performed by the server and related information and control commands may be transmitted to the moving object. Therefore, in the following description, the operations of the moving object may be substantially applied to and implemented in the server unless technical contradiction occurs.

Although the embodiments of the present disclosure are described as being performed on the fleet system in the below description, the present disclosure is not limited to the embodiment of using the fleet system. As another example, the embodiments of the present disclosure may be implemented by a system which exclusively performs smell sensibility management, instead of the fleet system for managing the shared moving object. Specifically, the user device may register the moving object of the user in a smell sensibility management system, and, when the user uses the moving object, the above embodiments are applicable to the moving object.

Figure 6:
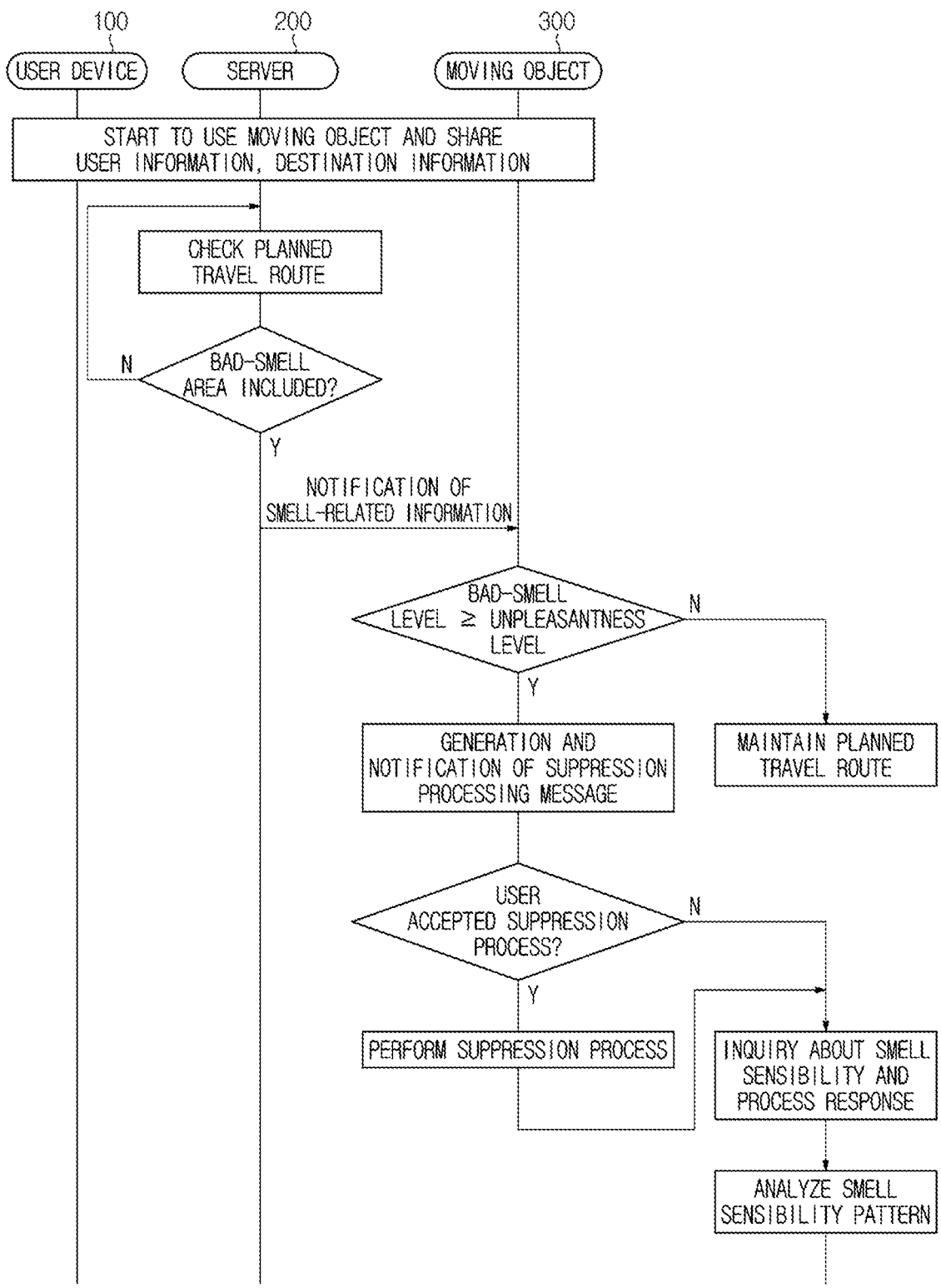
FIG. 6 is a flowchart illustrating a method of managing smell sensibility based on a route of a moving object according to an embodiment of the present disclosure.

FIG. 6 is a flowchart illustrating a method of managing smell sensibility based on a route of a moving object according to an embodiment of the present disclosure. Hereinafter, an embodiment of managing smell sensibility when a bad-smell area is included in a planned travel route will be focused upon and an embodiment of the case in which a noble-fragrance area is included will be described later with reference to FIG. 19.

First, a user device 100 may perform authentication with a moving object 300 to start use of the moving object requested through a server 200. A use request may be a message generated by at least a moving object use time. For example, a use request message may be generated by further including user position information along with the moving object use time.

The use request message may be generated by further including passenger information. As another example, the user device 100 may not include the passenger information at the time of the use request but may generate a message for adding the passenger information after a use start request and transmit the message to the moving object 300 and the server 200.

The use request may be a message including at least one of a moving object type, history information, preference information, grade information or usage pattern information, in addition to the moving object use time. The moving object type may be the type (e.g., small to large sedan, SUV, personal mobility, etc.) of the moving object selected by the user device at the time of request and detailed classification (e.g., maker, detailed model, a production year, cleanliness, etc. of the moving object). The history information, the preference information, the grade information and the usage pattern information are described above and detailed descriptions thereof will be omitted. The user device 100 may preset whether the above-described information is included through the application and program provided by the fleet system. If it is preset, the use request may be a message based on the moving object use time and information set in the user device 100, except for user position information. Even if it is preset, when the user device 100 further sets generation of the use request message including the position information along with the setting information and the use time or requests the use request message at the time of request, the use request message may be generated to include all the above-described information or may be generated based on position information requested by the user prior to estimated position information of the user inferred from the setting information.

When use starts in response to the request of the user device 100, the moving object 300 may receive user information from at least one of the server 200, the user device 100 or the identification device.

The user information may include information included in the use request message and the smell sensibility pattern information of the user. When passenger riding is requested through the user device 100, the user information may further include the smell sensibility pattern information of the passenger, that is, the extended user. Hereinafter, the user who controls driving and the extended user (passenger) may be referred to as a user unless a contradictory situation occurs. In addition, when the use request message includes only the use time and the identification information of the user, the moving object 300 may receive at least one of the history information, the preference information, the grade information, the usage pattern information from the server 200, for control suitable for the user.

In addition, the moving object 300 may obtain destination information of the user, and the user device 100 and the server 200 may share the information. When the destination information is included in the use request message or when the user inputs the destination information to the moving object 300 after starting the moving object, the moving object 300 may acquire the destination information. As an example of acquisition after starting, as the user may input a destination to a route guide unit (see 314 of FIG. 11; for example, navigation) mounted in the moving object 300 or when the destination information input through the user device 100 is transmitted to the moving object 300, the destination information may be transmitted to the moving object 300.

The smell sensibility pattern information will be described in detail. As shown in FIG. 7, the smell sensibility pattern information may include emotional (or subjective) unpleasantness level perceived by an individual user for each smell type and smell sensibility pattern data corresponding thereto. In addition, the smell sensibility pattern information may further include emotional (or subjective) preference recognized as noble fragrance and smell sensibility pattern data corresponding thereto for each smell type. The unpleasantness level and preference personalized for each smell type may be stored in at least one of the server 200, the identification device of the user described with reference to FIG. 4 or the identification device shown in FIG. 4. FIG. 7 is a view illustrating an individual user's unpleasantness level and smell sensibility pattern.

The unpleasantness level is generated based on a user response message to the smell sensibility inquiry before using the moving object 300, and the response message may include the user's sensitivity to the smell. As another example, the unpleasantness level is generated based on the user's response message to the smell sensibility inquiry after starting use of the moving object 300, and a previous unpleasantness level may be updated. The unpleasantness level after start may be generated in response to the unpleasantness level for a specific smell felt by the user during driving.

Figure 8:
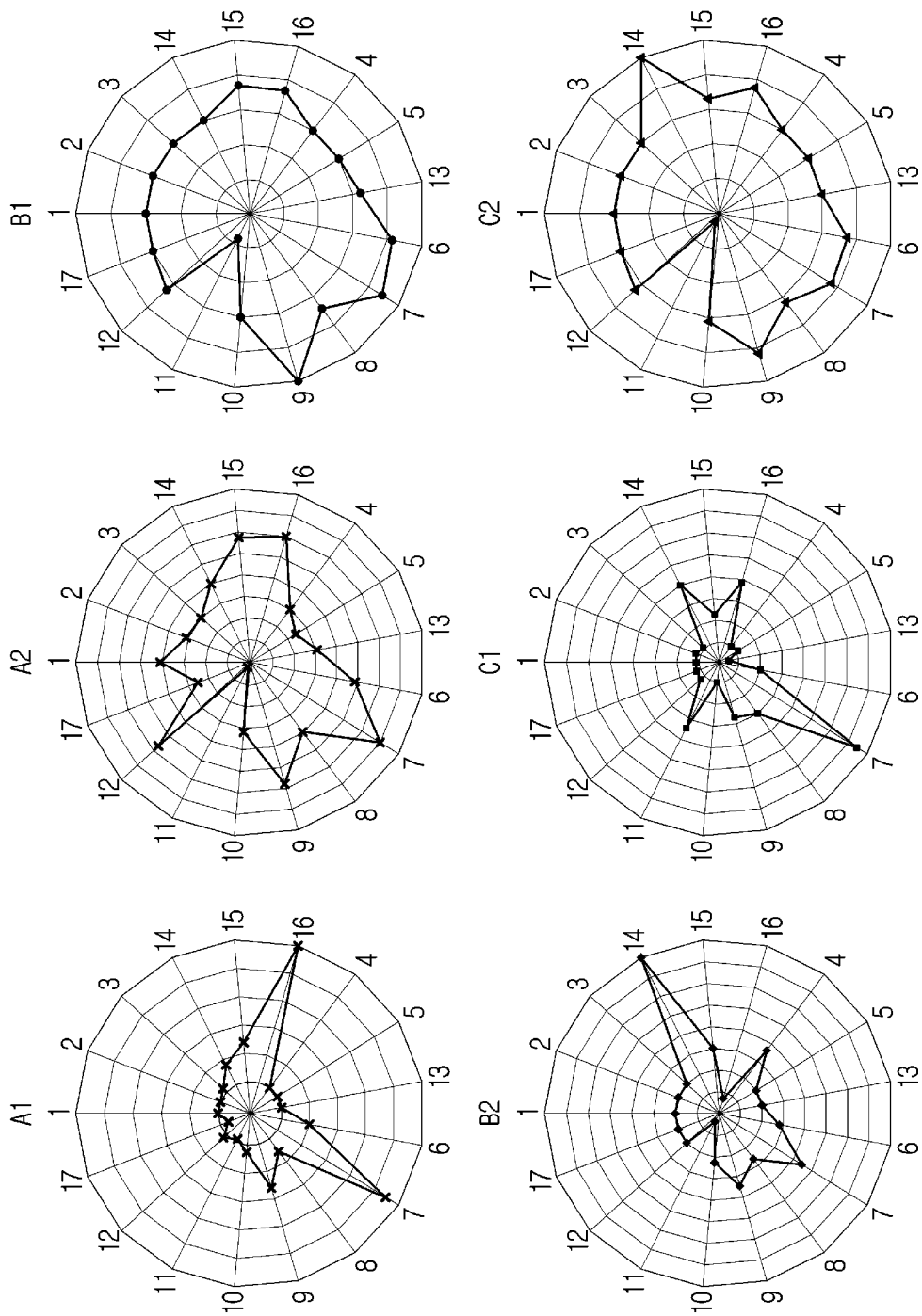
FIG. 8 is a view illustrating an example of smell information for each smell type.
Figure 9:
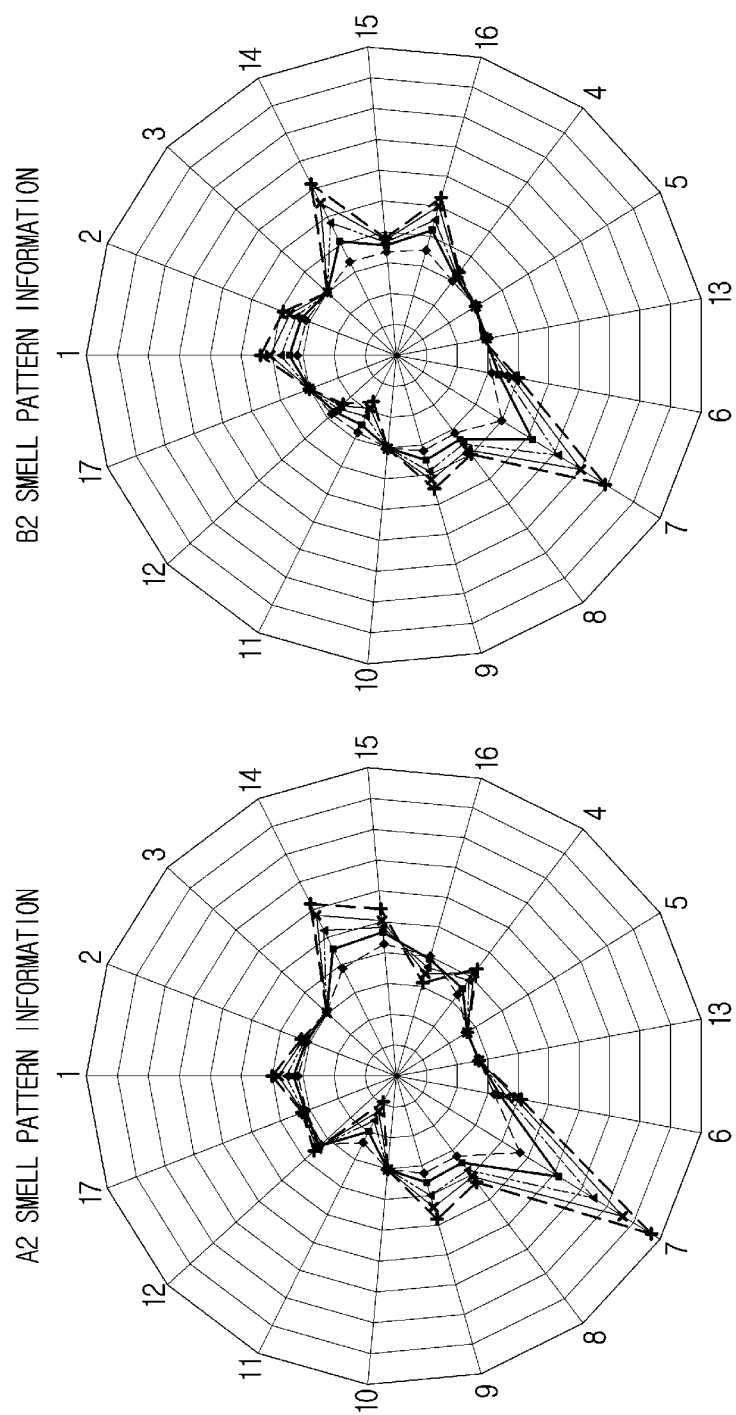
FIG. 9 is a view illustrating an example of calculating a smell sensibility pattern for each smell type.

Specifically, the unpleasantness level and the smell sensibility pattern will be described with reference to FIG. 7, for example. The unpleasantness level is a value subjectively evaluated by user A for each smell type and may be a sensitivity of user A who feels unpleasant for each smell. The smell type may include, for example, a smell of a chemical complex (A1), a smell of wastewater (A2), a smell of a livestock barn (B1), a smell of food waste (B2), etc. When user A subscribes to or starts to use the fleet system, the server 200 may transmit a smell sensibility inquiry message to the user device 100 for each smell. In addition, the user may directly input a smell which is not provided by the server 200 to the user device 100 for the smell sensibility inquiry. User A gives high, medium or low to the sensitivity of each smell and the server 200 may receive the unpleasantness level of user A. The server 200 may generate and store the smell sensibility pattern corresponding to the unpleasantness level of the user for each smell. For example, in FIG. 7, when the unpleasantness level of the smell A2 is "high", the smell sensibility pattern of the smell A2 may be smell pattern information corresponding to sensitivity level 2 among the patterns of FIG. 9 in which the smell pattern information of A2 shown in FIG. 8 is subdivided according to the sensitivity level. For example, when smell pattern information of an innermost side is sensitivity level 1 in FIG. 9, sensitivity level 2 may be smell pattern information of a next side of the innermost side. FIG. 8 is a view illustrating an example of smell information for each smell type. FIG. 9 is a view illustrating an example of calculating a smell sensibility pattern for each smell type.

As another example, the unpleasantness level may be generated based on the history information of the user accumulated in the process of using the moving object 300. The history information may include various movement routes of the user and may include whether the user traveled while avoiding the bad-smell area on a route including bad-smell areas (B3 and B4 of FIG. 10) with a specific smell. In addition, the history information may include whether the user mainly avoided a bad-smell area when the user moved on a planned travel route predetermined times in the past. Based on the history information, upon determining that the user traveled while avoiding the bad-smell area with the specific smell, the server 200 may obtain the smell pattern information of the bad-smell area and generate the smell sensibility pattern of the user.

As another example, the unpleasantness level may be generated based on the usage pattern information of the user accumulated in the process of using the moving object 300. The usage pattern information may include a movement route when a specific passenger rides, and may include whether the user who controls driving traveled while avoiding a bad-smell area on a route including the bad-smell area with a specific smell when the passenger rides. The usage pattern information may include whether the user mainly avoided the bad-smell area when the user moved together with the specific passenger on a planned travel route predetermined times in the past. Based on the usage pattern information, upon determining that the user traveled while avoiding the bad-smell area with the specific smell, the server 200 may obtain the smell pattern information of the bad-smell area and generate the smell sensibility pattern of the user.

The smell pattern information and the smell sensibility pattern related to the above-described unpleasantness level will now be described.

The smell pattern information may be generated based on smell information of each smell obtained by the moving object 300 during driving using a smell detector 312, as shown in FIG. 8. The smell detector 312 may be a sensor array including a plurality of sensors (a sensor for detecting 17 components shown in FIG. 8) for detecting components configuring a specific smell and concentrations thereof. As shown in the diagram of FIG. 8, the detection values of the sensors related to the smells of A1 to C2 may be represented in a radial pattern to configure the smell information. The smell information may be generated by the moving object 300 and transmitted to the server 200. The sensor detection value for a single gas may be generated in the form of a pattern in which the detection values of various sensors are combined. Since such gas patterns are equally applied to a mixture of gases, a pattern for smell sensibility may be stored in a database of the server 200.

When the user has a high unpleasantness level with respect to a specific smell, the unpleasantness level may significantly depend on a small amount of components among the components configuring the specific smell. For example, when a small amount of component 11 of a smell A2 significantly affects the unpleasantness level, the moving object 300 and the server 200 needs to accurately determine a small change in concentration of component 11. The smell information of A2 may be used without scale adjustment of the diagram, but, for determination accuracy, the smell information of A2 may be standardized to a normalized concentration value for each component, as shown in FIG. 8. For example, the scale of component 11 may be processed to correspond to a preset value, and the concentration value of component 11 may be displayed on a processed scale. In addition, the scale of each component of smell A2 may be converted according to normalization setting.

The smell sensibility pattern may be calculated as one pattern information among a plurality of smell pattern information distinguished for each sensitivity for the same type of smell. For example, as shown in FIG. 9, a plurality of smell pattern information of the same type may be expressed to be distinguished according to component concentration, and the distinguished concentration may be set in association with a sensitivity level.

The server 200 may have data of smell pattern information according to concentration change. Therefore, the server 200 may set the intensity of the smell corresponding to the unpleasantness level of the user, and derive an accurate result of the specific smell sensibility based on the intensity of the smell. That is, the smell pattern information may include a plurality of pattern data changed according to a smell intensity change, with respect to each smell sensibility, that is, a smell unpleasantness level. The server 200 or the moving object 300 may simultaneously determine the smell intensity along with the smell sensibility type based on such data.

For example, in FIG. 9, the smell A2 may include component 11 significantly affecting the unpleasantness level and have a per-concentration pattern of the component. Referring to the smell A2 of FIG. 9, it can be seen that a pattern in a similar form is extended according to increase in the concentration of the gas. That is, in the pattern of a specific smell, the shape of the pattern may be generally maintained despite concentration increase and decrease. Since the shape of the pattern is maintained, a plurality of smell pattern data may be generated by expansion and contraction of the pattern reflecting concentration increase and decrease. The expansion and contraction pattern in the smell pattern data may be calculated by machine learning in association with the unpleasantness level of the smell received from a plurality of users, and, as shown in FIG. 9, a plurality of patterns may be discretely generated for each sensitivity level corresponding to the unpleasantness level. In the example of FIG. 9, the pattern of a highest sensitivity level may be smell pattern information of an innermost side, and the pattern has a sensitivity level gradually decreasing toward the outside. When the user has a high unpleasantness level with respect to the smell A1, the smell sensibility pattern of the user for A2 may be set to pattern data (the second pattern data from the inside) corresponding to sensitivity level 2 in the smell pattern information of A2 shown in FIG. 9. Therefore, the server 200 may have the smell sensibility pattern for each smell of the user.

Although the smell sensibility pattern data according to the smell unpleasantness level was focused upon in the above description, preference for each smell felt by the user as noble fragrance and the smell sensibility pattern may be generated and calculated in a manner similar to the above description.

Figure 10:
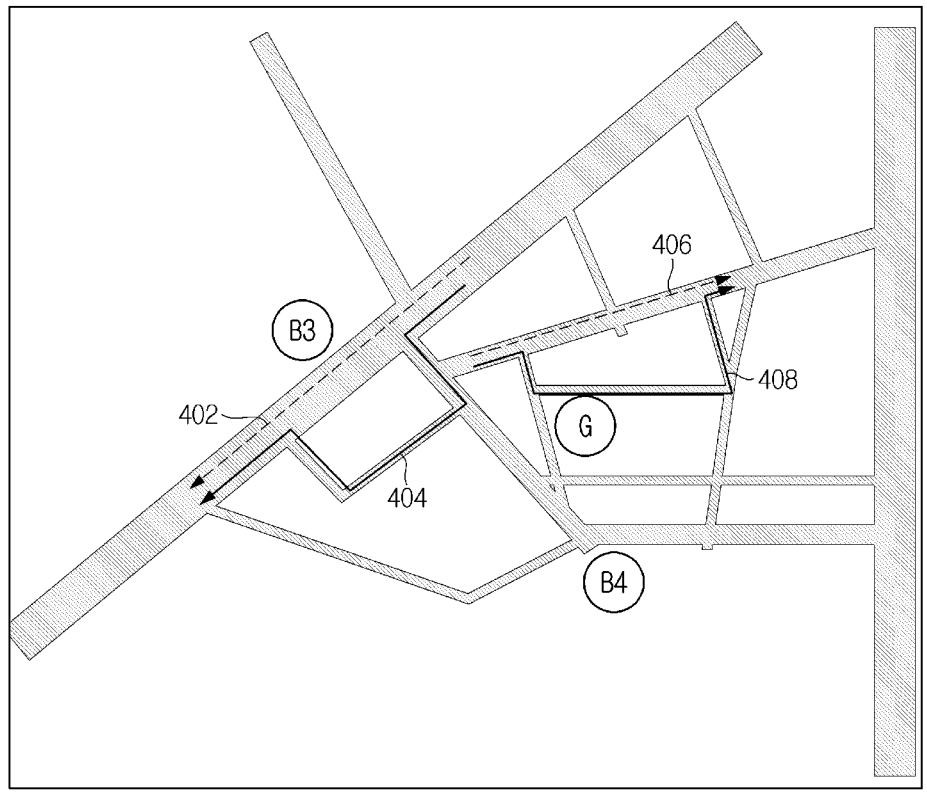
FIG. 10 is a view illustrating an example of a detour route of a planned travel route of a moving object.

Referring to FIG. 6 again, the server 200 may check the planned travel route (see 402 of FIG. 10) based on destination information input by the user through the moving object 300, as shown in FIG. 10, and determine whether a bad-smell area (see B3 of FIG. 10) is included in the planned route. FIG. 10 is a view illustrating an example of a detour route of a planned travel route of a moving object. Although, for convenience of description, the server 200 checks the bad-smell area according to the planned travel route, the moving object 300 may check the bad-smell area.

When the bad-smell area is included, the server 200 may notify the moving object 300 of smell-related information. The smell-related information may include smell information of the bad-smell area obtained from other moving objects 300 in the past or in real time. As another example, the smell-related information may include zone information affecting the smell of the bad-smell area along with smell information. The smell information may specify the smell type of the bad-smell area, and include the components and concentration of the smell of the bad-smell area. The smell information may include the diagram of the smell of the bad-smell area, and may be normalized smell pattern information as shown in FIG. 8.

The zone information may be information related to a factor which enhances or weakens the smell of the bad-smell area at a planned travel time. For example, the zone information may be weather information of the bad-smell area. A high temperature may enhance the smell by accelerating volatilization of organic chemical components of the smell components. In addition, normal rain may enhance a specific smell by containing smell components in moisture in air. Wind may weaken the intensity of the smell, by spreading the smell components to distant areas according to the wind speed. As another example, the zone information may be information related to whether facilities included in the bad-smell area are operating. When the bad-smell area is a chemical complex or wastewater treatment plant, the intensity of the smell may depend on whether the factory or treatment plant is operating. The zone information may include, for example, the weather information and the facility operation information, but is not limited thereto and may include any information if it is a factor for enhancing or weakening the smell.

The smell-related information may be smell pattern information generated by adding the zone information to the smell information of the bad-smell area. For example, when the bad-smell area is a chemical complex and the zone information indicating that the weather is a high temperature and all factories in the complex are operating is received, the smell information received in relation to the bad-smell area, for example, the concentration value for each component represented in the diagram of FIG. 8, may increase due to the high temperature and the factory operation. The smell information modified by the zone information may be generated as smell pattern information. The modified smell information may be generated by the server 200 as in this embodiment. As another example, the server 200 may transmit, as the smell-related information, the smell information and the zone information to the moving object 300, and the moving object 300 may calculate the modified smell information to generate smell pattern information. In the above-described example, the smell sensibility pattern is described as being composed of only single smell pattern information corresponding to the sensitivity level of the user among the smell pattern information shown in FIG. 9, but is not limited thereto. In another example, the smell sensibility pattern may have all the smell pattern information shown in FIG. 9 and may be generated by designating the sensitivity level of the user by a separate indication value. According to another example, the server 200 may not store a specific type of smell pattern information for each user, but may store only the sensitivity level of the smell for each user while commonly retaining pattern information for each smell for efficient storage. The server 200 may transmit, together with the sensitivity level of the user to a specific smell, all of the smell pattern information or the smell pattern information extracted in correspondence with the level, according to the request of the moving object 300.

The moving object 300 may determine the smell sensibility of the user, by comparing a bad-smell level based on the smell-related information with the unpleasantness level of the user related to the smell of the bad-smell area.

The moving object 300 may select the smell sensibility pattern of the user corresponding to the unpleasantness level. For example, in FIGS. 7 and 9, when the smell of the bad-smell area is A2 (chemical complex), as the smell sensibility pattern corresponding to the unpleasantness level of the user, smell pattern information of A2 according to sensitivity level 2 may be selected. The moving object 300 may recognize smell pattern information calculated from the smell-related information as a bad-smell level, and determine whether smell pattern data according to the bad-smell level is equal to or greater than A2 pattern data of sensitivity level 2. When the bad-smell level is smell pattern information of A2 corresponding to sensitivity level 3 outside level 2 shown in FIG. 9, it may be determined that the bad-smell level is equal to or greater than the smell sensibility pattern of the user. On the contrary, when the bad-smell level is smell pattern information of A2 corresponding to sensitivity level 1 inside level 2 shown in FIG. 9, it may be determined that the bad-smell level is less than the smell sensibility pattern of the user.

As another example, a predetermined learning algorithm or machine learning may be used to compare the smell pattern information received as the bad-smell level with the sensitivity level of the smell sensibility pattern. The learning algorithm may be implemented to check similarity between the smell pattern information and the smell pattern information shown in FIG. 9. In this case, the server 200 may transmit the smell pattern information corresponding to the smell type to the moving object 300, and the moving object 300 may check similarity. Pattern data most similar to the bad-smell level among the smell pattern information, for example, the smell information patterns of A2 shown in FIG. 9, may be checked and the sensitivity level corresponding to the checked pattern data may be determined. The moving object 300 may determine whether the bad-smell level is equal to or greater than the unpleasantness level of the user, by comparing the bad-smell level with the sensitivity levels of the smell sensibility pattern of the user. Therefore, the smell sensibility of the user may be determined based on the bad-smell level of the bad-smell area and the personalized unpleasantness level of the user.

In the above-described embodiment, the moving object 300 determines the unpleasantness level. In another example, the server 200 may determine the unpleasantness level and then notify the moving object 300 of a result value.

Subsequently, when the bad-smell level is equal to or greater than the unpleasantness level of the user, the moving object 300 may generate a suppression processing message and notify the user of it.

Figure 11:
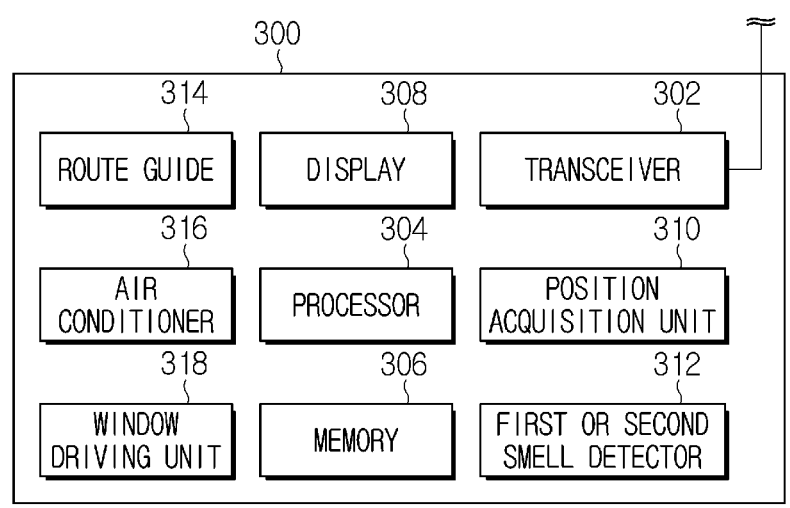
FIG. 11 is a block diagram illustrating functional modules of a moving object.

The suppression processing message may provide an option to block introduction of a bad smell into the moving object 300 before entering the bad-smell area. For example, the option may include, as shown in FIG. 10, an option for guiding a detour route 404 avoiding the bad-smell area B3 in the planned travel route 402 through a route guide 314 or various options for suppressing introduction of a bad smell into the moving object 300 when passing through the bad-smell area B3. FIG. 10 is a view illustrating an example of a detour route of a planned travel route of a moving object. The detour route may be determined as a detour route of a minimum distance among routes having less than the unpleasantness level of the user for each smell. The bad-smell introduction suppression option may provide the user with a window sealing and inlet sealing option by a window driving unit 318 and an air conditioner 316 shown in FIG. 11, a neutralizing gas injection option by the air conditioner 316 and an option to discharge outside air introduced into the moving object 300 by the air conditioner 316. FIG. 11 is a block diagram illustrating functional modules of a moving object. The options may be, for example, displayed on a display 308 mounted in the moving object 300 to provide an interface capable of selecting an option to the user. The interface may be a visual button capable of touch input on the display 308 or a module capable of voice recognition, and the user may select an option through a touch gesture or voice.

The moving object 300 may recognize that the user has accepted the suppression process when the user selects at least one of various options, and perform the suppression process according to the selected option when reaching the vicinity of the bad-smell area B3 using a position acquisition unit 310.

The window sealing option may be an option to seal the window before entering the bad-smell area, by controlling the window driving unit 318 by a processor 304. The window may be completely sealed for reliable isolation from the outside. As another example, the processor 304 may partially seal the window in a range in which bad smell introduction is substantially suppressed, for ventilation.

The inlet sealing option may be an option to seal the inlet before entering the bad-smell area, by controlling the air conditioner 316 by the processor 304. The inlet may be completely sealed for reliable isolation from the outside. As another example, the processor 304 may partially seal the inlet in a range in which bad smell introduction is substantially suppressed, for ventilation.

In the neutralizing gas injection option by the air conditioner 316, the processor 304 may determine the concentration and injection amount of the neutralizing gas based on the bad-smell level and an internal smell sensor. In addition, in the injection option, a neutralizing gas provider may spread the neutralizing gas according to the concentration inside the moving object 300 along inside air supplied from the air conditioner 316.

In the option to discharge outside air introduced into the moving object 300 by the air conditioner 316, in (immediately after) the bad-smell area, the processor 304 may determine an opening degree of an outdoor unit of the air conditioner 316 based on the internal smell sensor. In addition, in the outside air discharge option, the processor 304 may reduce the bad-smell level by a mixture of a bad smell and outside air, by opening the outdoor unit according to the opening degree.

After passing through the bad-smell area B3, the moving object 300 may release the suppression process of the selected option. For example, window and inlet sealing, neutralizing gas injection and outside air discharge may be released to allow introduction of outside air.

When the user does not select an option at all, the moving object 300 may recognize that the user did not accept the suppression process and may not perform the bad-smell introduction suppression process while maintaining the planned travel route.

When the bad-smell level is less than the unpleasantness level, the moving object 300 may not provide the detour route 404 to maintain the planned travel route 402. In addition, for the user's comfortable driving, the moving object 300 may provide the user with the above-described options for bad-smell introduction suppression, when passing through the bad-smell area. The moving object 300 may control the moving object 300 according to the option selected by the user.

The moving object 300 may present a smell sensibility inquiry message to the user through the display 308 during driving or after the end of use, and receive a response related to the smell and sensitivity from the user.

The smell sensibility inquiry message may include at least one of a smell type or a predetermined point of the driving movement route 410 in relation to the smell inquiry. The smell type may be, for example, a specific smell occurring in the bad-smell area B3 when the user passes through the bad-smell area B3 having an unpleasantness level or more without detour or a plurality of smells listed as the example of FIG. 7. The smell sensibility inquiry message may be presented as a plurality of points on the driving movement route 410 or a touch interface for user position designation may be provided, as shown in FIG. 12. The presented point may be, for example, at least one of the bad-smell area B3 having the unpleasantness level or more on the driving movement route 410 or the bad-smell area (e.g., S facility or W wastewater treatment plant) detected through the smell detector 312 of the moving object 300. When the user selects a point related to the bad-smell area, a smell related to the selected bad-smell area B3 may be identified. When the user arbitrarily selects a specific point on the driving movement route 410, the moving object 300 may present a plurality of smell types to the user, such that the user selects a smell or directly inputs a smell. As another example, the smell of the specific point may be obtained from the history of the smell information obtained from the smell detector 312 of the moving object 300. In addition, the smell sensibility inquiry message may be provided to receive the unpleasantness level according to the smell or point selected by the user in relation to the sensibility query, as shown in FIG. 12.

Next, the server 200 may check the type of a smell, to which the user's sensitivity is changed, when receiving a response related to the smell and the unpleasantness level from the moving object 300, and the server 200 may analyze and update the smell sensibility pattern of the user as shown in FIG. 13. The smell sensibility pattern may be analyzed as described with reference to FIG. 9.

In this embodiment, the moving object determines the sensibility of the user for the bad-smell area and performs the suppression process. However, in another example, the server determines the sensibility of the user and transmits a result of determination to the moving object, and the moving object may perform the suppression process according to the result of determination.

In this embodiment, the suppression process when only the bad-smell area having the user's unpleasantness level or more is included in the planned travel route was focused upon. As another example, when the noble-fragrance area having the user's preference or more is mixed near the bad-smell area, the server 200 may notify the moving object 300 of the smell information of the noble fragrance and the bad smell in the mixed area. The moving object 300 may set the bad-smell level to be low when the bad smell is diluted and canceled by noble fragrance based on the smell information. In addition, upon determining that the intensity of the noble fragrance is high to suppress the bad smell, the moving object 300 may perform a determination process according to preference of FIG. 19, instead of the determination process according to the unpleasantness level of FIG. 6. By the above examples, the moving object 300 may not perform the suppression process with respect to the mixed area or may perform the introduction process according to FIG. 19 when the noble fragrance of the mixed area is equal to or greater than the preference of the user. Although, in the above example, the moving object 300 performs the determination process by cancellation and bad-smell suppression by noble fragrance, the server 200 may perform the determination process and notify the moving object 300 of the result of determination.

Figure 14:
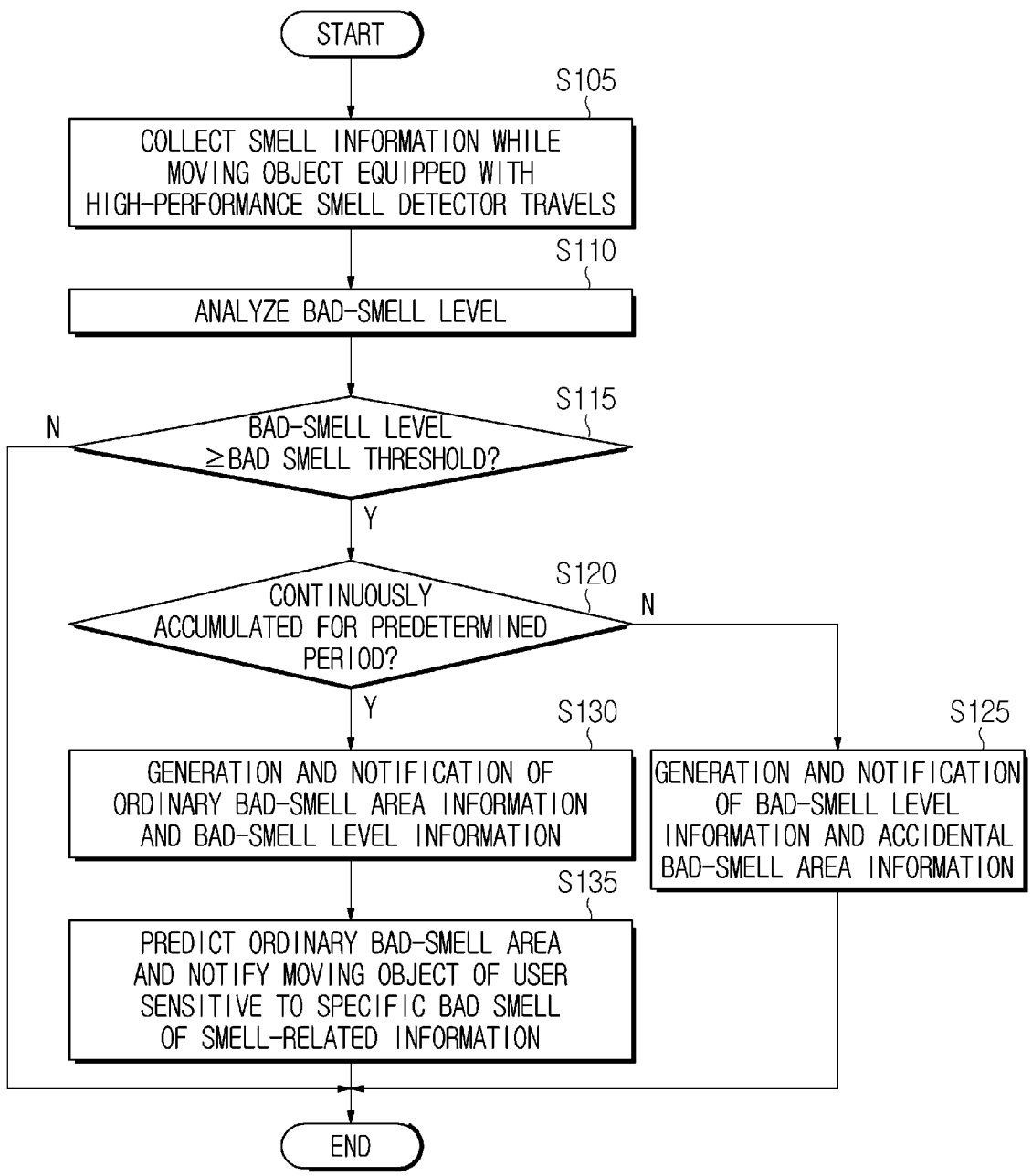
FIG. 14 is a flowchart of a method of designating a bad-smell area according to another embodiment of the present disclosure.

FIG. 14 is a flowchart of a method of designating a bad-smell area according to another embodiment of the present disclosure. An ordinary bad-smell area and an accidental bad-smell area designated according to this embodiment may be the bad-smell area of FIG. 6.

First, the moving object 300 includes the smell detector 312, and may analyze and collect the smell information during movement detected through the smell detector 312 (S105).

Figure 15A:
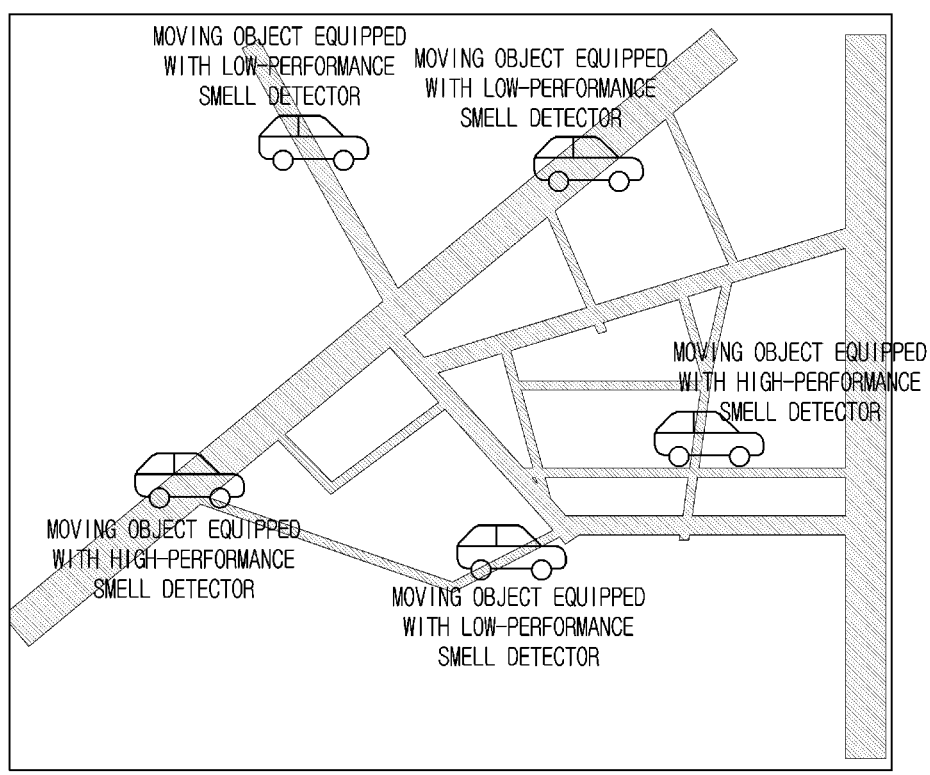
FIGS. 15A and 15B are views illustrating collection of smell information of a moving object and propagation to another moving object.
Figure 15B:
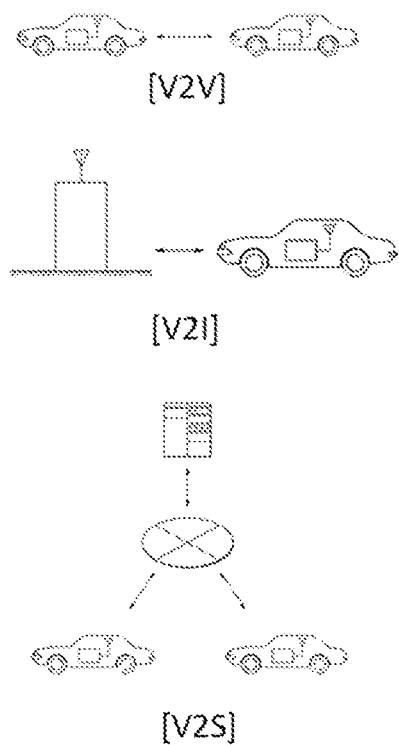

The smell detector 312 may have any one of a first smell detector and a second smell detector having lower performance than the first smell detector. FIGS. 15A and 15B are views illustrating collection of smell information of a moving object and propagation to another moving object. In FIGS. 15A and 15B, the first and second smell detectors may be respectively referred to as high-performance and lower-performance smell detectors, and, hereinafter, the first and second smell detectors may be called high-performance and lower-performance smell detectors. For example, the high-performance smell detector may have many chemical component gases and concentration ranges and high concentration precision compared to the low-performance smell detector. In this embodiment, collecting the smell information by the first smell detector to designate the bad-smell area will be focused upon.

The moving object 300 including the high-performance smell detector (hereinafter referred to as a "high-performance moving object") may be assigned a user who has requested a planned travel route 402 different from that of a moving object including the low-performance smell detector (hereinafter referred to as a "low-performance moving object"), according to at least one of the usage pattern information or destination information of the user, as shown in FIG. 15A. Specifically, the server 200 may perform control to assign the moving object 300 including the high-performance smell detector to a user who travels on a route, the smell-related information of which is not collected, among various routes. In addition, the server 200 may assign a plurality of high-performance moving objects 300 to travel on different routes and assign the low-performance moving object to travel on a route, the smell-related information of which is collected by the high-performance moving object, as much as possible.

Figure 16:
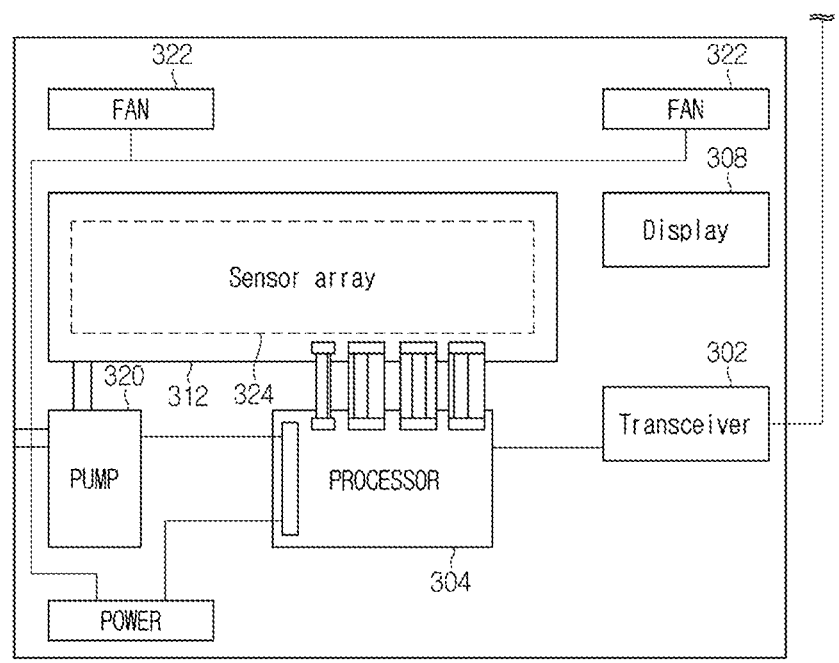
FIG. 16 is a view illustrating the configuration of an analysis device of smell pattern information.

An analysis device of the smell sensibility pattern mounted in the moving object 300 may include a high-frequency or low-performance smell detector. Since only the type of the mounted smell detector varies according to performance and the other members of the analysis device are substantially the same, for convenience of description, the smell detector is referred to as a sensor array, and the analysis device will be described with reference to FIG. 16. The analysis device is not limited to the example shown in FIG. 16 and various examples are possible. FIG. 16 is a view illustrating the configuration of an analysis device of smell pattern information.

Referring to FIG. 16, the analysis device of the smell sensibility pattern may include a sensor array 312 including a plurality of sensors and a processor 304 for determining smell sensibility from data detected by the sensor array 312.

In addition, for example, the analysis device may include at least one of a pump 320 for supplying a detected gas to the sensor array 312, a manifold 324 installed on the sensor array 312 to equally distribute the gas injected from the pump to the sensors of the sensor array 312 or a fan 322 for discharging the injected gas.

In addition, the analysis device may include a display 308 for outputting information determined by the processor 304 to the outside, and may include a power source for supplying power to each component including the processor 304.

The sensor array 312 may include at least one sensor capable of detecting main components of a smell to be detected, as described above. For example, the sensor array 312 may include a plurality of sensors including temperature and humidity sensors, and may be appropriately selected according to the smell to be detected. For example, the sensor array 312 may include two or more sensors having a detection function for at least one of gas groups of various chemical components. The sensor array 312 may collect output values of the sensors, and the processor 304 may generate smell pattern information for a detection target, as shown in FIG. 8.

In addition, the analysis device may include a transceiver 302 for performing communication with another device. The analysis device may receive data necessary to analyze the smell pattern information using the transceiver 302 and transmit the smell pattern information to another device such as at least one of the server 200 or another moving object 300.

Next, the moving object 300 may analyze the bad-smell level based on the smell information collected from the high-performance smell detector and obtain position information of a point where a bad smell has occurred (Silo).

The moving object 300 may analyze the bad-smell level, when detecting a smell related to a bad smell based on the smell information continuously collected during driving, using the high-performance smell detector. The smell information obtained during driving may be generated as smell pattern information as shown in FIG. 8, and the moving object 300 may calculate the bad-smell level based on the smell pattern information. As shown in the diagram of FIG. 8, the detection values of the sensors related to the smell of A1 to C2 may be expressed in a radial pattern to configure the smell information. The moving object 300 may standardize each component of the smell to a normalized concentration value, in order to calculate the bad-smell level.

The moving object 300 may acquire position information of an area in which a bad smell has been detected using a position acquisition unit 310, and record the bad-smell level of the area and the position information to match each other. The moving object 300 may obtain an object and situation data around the position information from the server 200 and match the object and the bad-smell level. The object and situation data may be, for example, a facility estimated to cause a bad smell, information on a bad-smell substance leakage accident and a general peripheral facility.

In the above step, the moving object 300 analyzes the bad-smell level. However, in another example, the server 200 may receive the smell information from the moving object 300 and analyze the bad-smell level.

Subsequently, the server 200 may receive, from the moving object 300, the bad-smell level and the position information, and determine whether the bad-smell levels obtained from a plurality of moving objects 300 are continuously accumulated with a bad-smell threshold or more (S120), upon determining that the bad-smell level is equal to or greater than the bad-smell threshold (Y of S115).

The bad-smell threshold may be set to a value with high sensitivity for each bad smell. For example, in FIG. 9, the bad-smell threshold of A2 may be set to pattern data (first pattern data from the inside) corresponding to sensitivity level 1 in the smell pattern information of A2. For comparison with the bad-smell threshold, it may be determined whether the bad-smell level based on the smell pattern information is equal to or greater than the bad-smell threshold using machine learning. Continuous accumulation may be determined by determining whether a predetermined time has elapsed regardless of the smell type or whether a time set for each smell has elapsed.

When a period continued with the bad-smell threshold or more is less than a predetermined period (N of S120), the server 200 may set a position where the bad smell has occurred as an accidental bad-smell area and generate accidental bad-smell area information and the bad-smell level information of the area (S125).

The server 200 may transmit the accidental bad-smell area information and the bad-smell level information to a moving object 300 which travels around the accidental bad-smell area or has the accidental bad-smell area set as a planned travel route, along with the moving object 300 which has transmitted the smell information. As another example, the moving object 300 which has transmitted the smell information may receive the information from the server 200 and then transmit the information to the moving object 300 adjacent to the moving object which has transmitted the smell information.

Contrary to this, when a period continued with the bad-smell threshold or more is the predetermined period (Y of S120), the server 200 may set a position having the threshold or more as the ordinary bad-smell area and generate the ordinary bad-smell area information and the bad-smell level information of the area (S130).

The server 200 may transmit the ordinary bad-smell area information and the bad-smell level information to a moving object 300 which travels around the ordinary bad-smell area or has a planned travel route including the ordinary bad-smell area. As another example, as shown in FIG. 15B, the moving object 300 which has transmitted the smell information may receive the information from the server 200 and then transmit the information to a neighboring moving object 300. The moving object 300 may transmit the information to the neighboring moving object 300, for example, through broadcasting, vehicle-to-everything (V2X) such as vehicle-to-vehicle (V2V), vehicle-to-infrastructure (V2I), data exchange (V2Server) between moving objects through a server. Since the high-performance smell detector is expensive, all moving objects 300 cannot include the high-performance smell detector. Accordingly, the first smell detector may be mounted in some of the moving objects provided by the fleet system.

Next, the server 200 may notify the moving object 300 of a user who is sensitive to the bad smell occurring in the area among the moving objects 300, which travel around the ordinary bad-smell area or include the area as the planned travel route, of the smell-related information of the area (S135).

The smell-related information may include the smell information and the zone information as described with reference to FIG. 6. As another example, the smell-related information may be smell pattern information generated by adding the zone information to the smell information of the bad-smell area. The moving object 300 may determine the smell sensibility of the user, by comparing the bad-smell level based on the smell-related information with the unpleasantness level of the user, as shown in FIG. 6.

In this embodiment, the method of designating the bad-smell area is described. However, a method similar to this embodiment is applicable to designation of an accidental and ordinary noble fragrance area.

Figure 17:
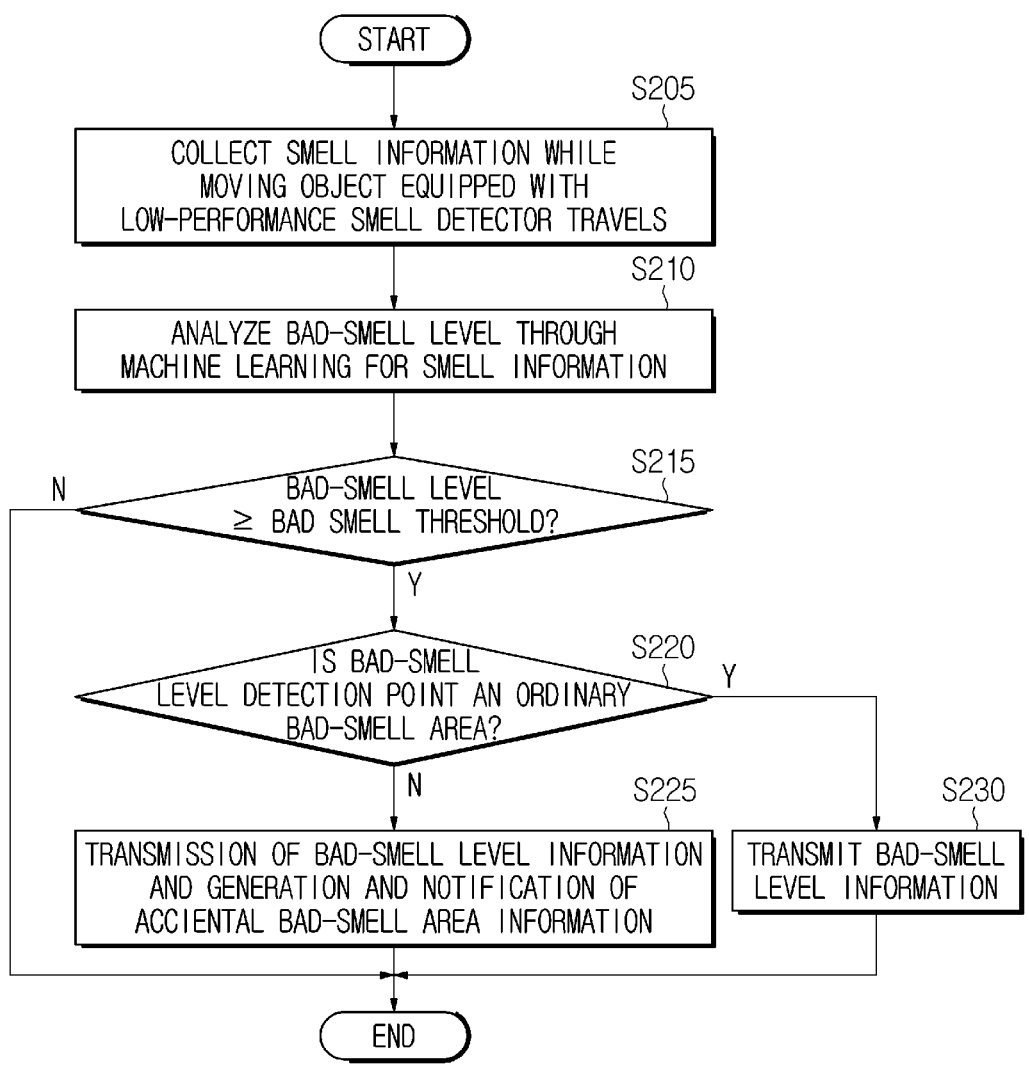
FIG. 17 is a flowchart of a method of designating a bad-smell area according to another embodiment of the present disclosure.

FIG. 17 is a flowchart of a method of designating a bad-smell area according to another embodiment of the present disclosure. In this embodiment, unlike the embodiment of FIG. 14, collecting smell information and designating a bad-smell area by a moving object having a low-performance smell detector mounted therein will be described.

First, the moving object 300 may analyze and collect the smell information during movement detected through the low-performance smell detector (S205).

The low-performance moving object 300 may be a moving object having the low-performance smell detector mounted in the sensor array 312 in the analysis device of the smell pattern information shown in FIG. 16.

Next, the moving object 300 may analyze the bad-smell level based on the smell information collected from the low-performance smell detector and acquire position information of a point where a bad smell has occurred (S210).

The moving object 300 may analyze the bad-smell level, when detecting a smell related to the bad smell based on the smell information continuously collected during driving, using the low-performance smell detector. Since the smell information acquired by the low-performance smell detector has lower precision than the high-performance smell detector, the bad-smell level may be calculated based on machine learning for analyzing the bad-smell level. For example, the machine learning may be an algorithm for inferring the smell pattern information based on the smell information, through matching learning for analyzing similarity between the smell information of the low-performance smell detector and smell pattern information of the high-performance smell detector. Smell data processed by machine learning based on the low-performance smell detector may be generated as smell pattern information as shown in FIG. 8, and the moving object 300 may calculate the bad-smell level based on the smell pattern information.

The moving object 300 acquires the position information of the area where the bad smell is detected using the position acquisition unit 310, and records the bad-smell level of the area and the position information to match each other. The moving object 300 may obtain an object and situation data around the position information from the server 200 and match the object and the bad-smell level.

In the above step, the moving object 300 analyzes the bad-smell level. However, in another example, the server 200 may receive the smell information from the moving object 300 and analyze the bad-smell level.

Subsequently, the server 200 may receive, from the moving object 300, the bad-smell level and the position information, and determine whether a bad-smell level detection point is an ordinary bad-smell area (S220), upon determining that the bad-smell level is equal to or greater than a bad-smell level threshold (Y of S215).

When the bad-smell level detection point is not an ordinary bad-smell area (N of S220), the server 200 may set a position where the bad smell has occurred as an accidental bad-smell area and generate the accidental bad-smell area information and the bad-smell level information of the area (S225).

The server 200 may transmit the accidental bad-smell area information and the bad-smell level information to a moving object 300 which travels around the accidental bad-smell area or has the accidental bad-smell area set as a planned travel route, along with the moving object 300 which has transmitted the smell information. As another example, the moving object 300 which has transmitted the smell information may receive the information from the server 200 and then transmit the information to the moving object 300 adjacent to the moving object which has transmitted the smell information. In addition, the server 200 may continuously assign a high-performance moving object 300 including the accidental bad-smell area as the planned travel route during a predetermined period, in order to determine whether the bad-smell level of the accidental bad-smell area continues during the predetermined period or more. The high-performance moving object 300 may obtain precise smell information during the above period, thereby securing accuracy in designation of the ordinary bad-smell area.

Contrary to this, when the bad-smell level detection point is an ordinary bad-smell area (Y of S220), the moving object 300 may transmit the bad-smell level, for example, the smell-related information, to the server 200 or another moving object 300 in real time (S230). The other moving object 300 may be a moving object 300 which travels around the moving object 300 which has detected the bad-smell level, or includes the area in the planned travel route. The bad-smell level may be substantially equal to the bad-smell level shown in FIG. 6, and may be used as the smell-related information.

In this embodiment, the method of designating the accidental bad-smell area is described. However, a method similar to this embodiment is applicable to designation of an accidental noble fragrance area.

Figure 18:
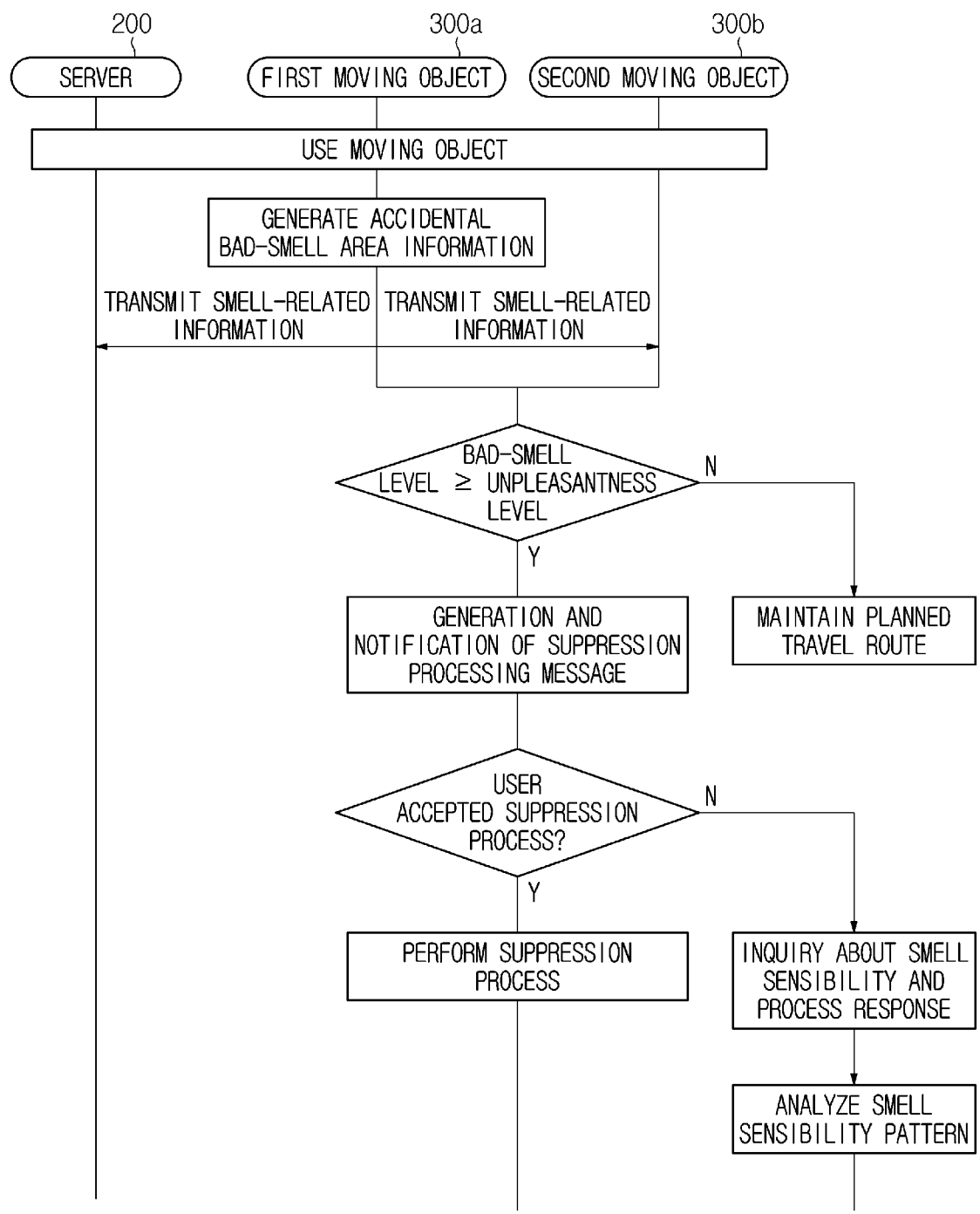
FIG. 18 is a flowchart illustrating a method of transmitting a bad-smell area checked by a first moving object to a second moving object, according to another embodiment of the present disclosure.

FIG. 18 is a flowchart illustrating a method of transmitting a bad-smell area checked by a first moving object to a second moving object, according to another embodiment of the present disclosure.

After starting to use a first moving object 300*a* and a second moving object 300*b*, the first moving object 300*a* may acquire smell information at a point where a bad smell has occurred as shown in FIGS. 14 and 17. When the server 200 determines an accidental bad-smell area based on the smell information, the first moving object 300*a* may receive a result of determination and generate the accidental bad-smell area information of the bad-smell point.

The first moving object 300*a* may transmit accidental bad-smell area information and smell-related information based on the acquired smell information to the server 200 and the second moving object 300*b*. The second moving object 300*b* may be a moving object 300 which travels around the first moving object 300*a* or includes the area in the planned travel route.

In the second moving object 300*b*, similarly to FIG. 6, when the bad-smell level is equal to or greater than the unpleasantness level of the user, the moving object 300 may generate a suppression processing message and notify the user of it.

The suppression processing message may provide an option to block introduction of a bad smell into the moving object 300 before entering the bad-smell area. For example, the option may include, as shown in FIG. 10, an option for guiding a detour route 404 avoiding the bad-smell area B3 in the planned travel route 402 through the route guide 314 or various options for suppressing introduction of a bad smell into the moving object 300 when passing through the bad-smell area B3. The detour route may be determined as a detour route of a minimum distance among routes having less than the unpleasantness level of the user for each smell. The bad-smell introduction suppression option may provide the user with a window sealing and inlet sealing option by a window driving unit 318 and an air conditioner 316 shown in FIG. 11, a neutralizing gas injection option by the air conditioner 316 and an option to discharge outside air introduced into the moving object 300 by the air conditioner 316.

The moving object 300 may recognize that the user has accepted the suppression process when the user selects at least one of various options, and may perform the suppression process according to the selected option when reaching the vicinity of the bad-smell area B3 using the position acquisition unit 310. After passing through the bad-smell area B3, the moving object 300 may release the suppression process of the selected option.

When the user does not select an option at all, the moving object 300 may recognize that the user did not accept the suppression process and may not perform the bad-smell introduction suppression process while maintaining the planned travel route.

When the bad-smell level is less than the unpleasantness level, the moving object 300 may not provide the detour route 404 to maintain the planned travel route 402. In addition, for the user's comfortable driving, the moving object 300 may provide the user with the above-described options for bad-smell introduction suppression when passing through the bad-smell area. The moving object 300 may control the moving object 300 according to the option selected by the user.

The moving object 300 may present a smell sensibility inquiry message to the user through the display 308 during driving or after the end of use, and receive a response related to the smell and sensitivity from the user. This is substantially equal to the method described with reference to FIG. 6 and a detailed description thereof will be omitted.

Next, the server 200 may check the type of a smell, to which the user's sensitivity is changed, when receiving a response related to the smell and the unpleasantness level from the moving object 300, and the server 200 may analyze and update the smell sensibility pattern of the user as shown in FIG. 13. The smell sensibility pattern may be analyzed as described with reference to FIG. 9.

In this embodiment, the accidental bad-smell area information is transmitted to the first moving object and the second moving object to perform the suppression process. However, a method similar to this embodiment is applicable to a method of performing an induction process by transmitting accidental noble fragrance area information between moving objects.

Figure 19:
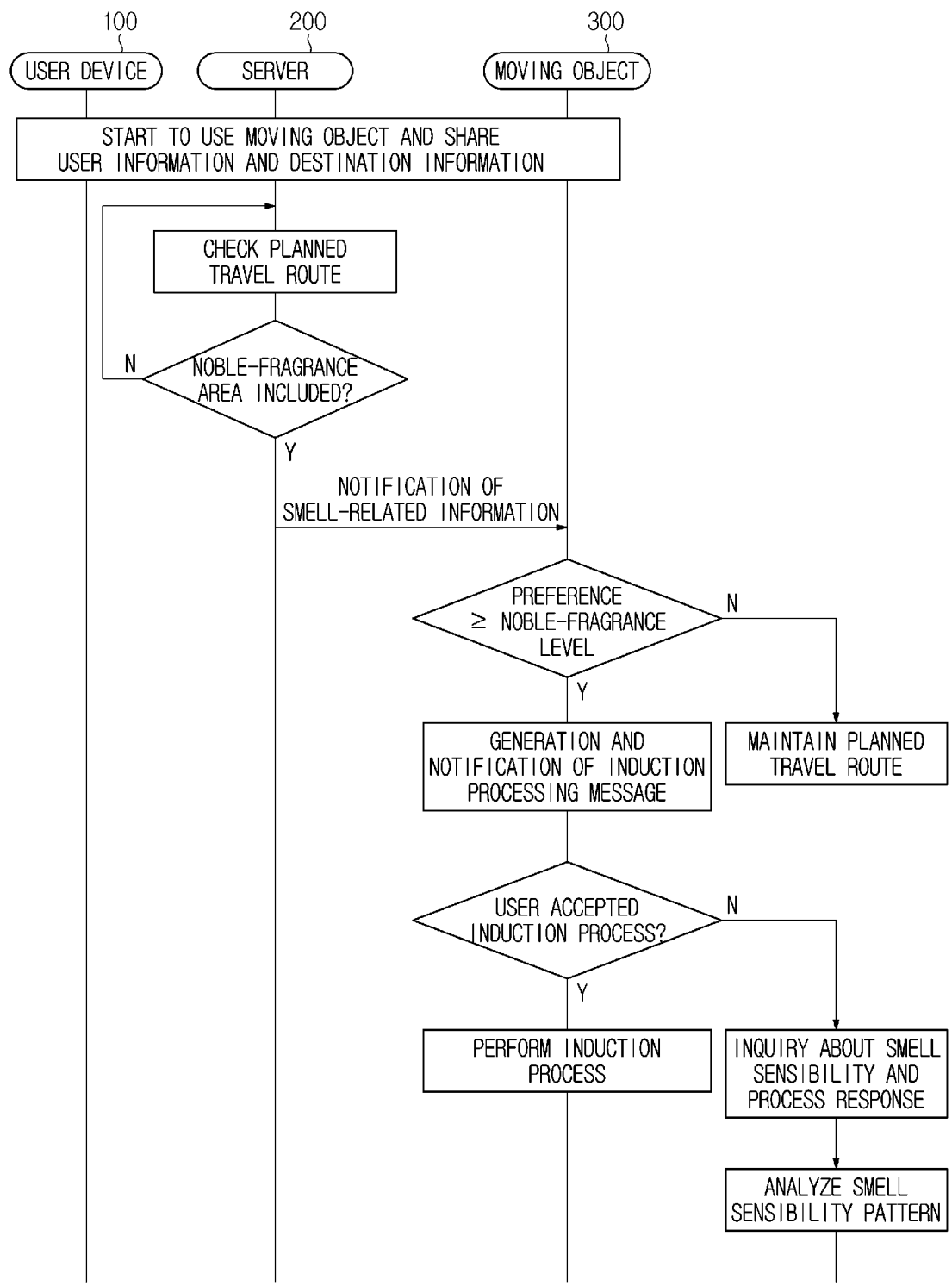
FIG. 19 is a flowchart illustrating a method of managing smell sensibility based on a route of a moving object according to another embodiment of the present disclosure.

FIG. 19 is a flowchart illustrating a method of managing smell sensibility based on a route of a moving object according to another embodiment of the present disclosure.

First, a user device 100 may start to use a moving object through a server 200, by performing authentication with the moving object 300. A use request may be a message generated based on at least a moving object use time. For example, the use request message may be generated by further including user position information along with the moving object use time. As another example, the use request message may be generated by further including passenger information.

When use starts by the request of the user device 100, the moving object 300 may receive user information from at least one of the server 200, the user device 100 or the identification device.

The user information may include information included in the use request message and smell sensibility pattern information of a user. When passenger riding is requested through the user device 100, the user information may further include smell sensibility pattern information of a passenger, that is, an extended user.

Hereinafter, a user who controls driving and an extended user (passenger) are collectively referred to as a user, unless a contradictory situation occurs.

In addition, the moving object 300 may obtain destination information of the user, and the user device 100 and the server 200 may share the information. When destination information is included in the use request message or the user inputs destination information to the moving object after the moving object 300 starts, the moving object 300 may acquire destination information. As an example of acquisition after starting, as the user inputs a destination to the route guide 314 mounted in the moving object 300 or the destination information input through the user device 100 is transmitted to the moving object 300, the destination information may be transmitted to the moving object 300.

The smell sensibility pattern information may include emotional (or subjective) preference recognized as noble fragrance for each smell type and smell sensibility pattern data corresponding thereto. Similarly to FIG. 7, the preference is, for example, generated based on a response message of the user to the smell sensibility inquiry before using the moving object 300, and the response message may include the preference of the user for each smell. As another example, the preference is generated based on a response message of the user to the smell sensibility inquiry after starting to use the moving object 300. The preference after start may be generated in response to the preference for a specific smell felt by the user during driving.

The preference is a value of each smell type subjectively evaluated by the user and may be sensitivity recognized by the user as noble fragrance for each smell. The smell type may include, for example, various flower scents, a plurality of tree scents, various refreshing scents, etc. When the user subscribes to the fleet system or after the start of use, the server 200 may transmit the smell sensibility inquiry message to the user device 100 for each smell. In addition, the user may directly input a scent which is not presented by the server 200 to the user device 100, in response to the smell sensibility inquiry. In addition, as the user gives a level such as high, medium or low to the sensitivity for each smell, the server 200 may receive the preference of the user. The server 200 may generate and store the smell sensibility pattern corresponding to the preference of the user for each smell.

The smell sensibility pattern may be calculated as one pattern information among a plurality of smell pattern information distinguished by sensitivity for the same type of smell. For example, as shown in FIG. 9, a plurality of smell pattern information of the same type may be represented to be distinguished according to component concentration, and the distinguished concentration may be set in association with the sensitivity level. For example, when the preference for a specific flower scent has a level "high", the smell sensibility pattern for the flower scent may be smell pattern information corresponding to sensitivity level 1 subdivided according to sensitivity level, similarly to FIG. 9. Sensitivity level 1 may be smell pattern information in which the concentration of a specific component configuring the flower scent corresponds to a minimum value.

As another example, the preference may be generated based on history information of the user accumulated in the process of using the moving object 300. The history information may include various movement routes of the user, and may include whether the user intentionally detoured to a noble fragrance area on a route which does not include a noble-fragrance area (G of FIG. 10) where a specific smell occurs. In addition, the history information may include whether the user mainly detoured to the noble-fragrance area when the user moved on the planned travel route predetermined times in the past. Based on the history information, upon determining that the user detoured to the noble-fragrance area of the specific smell, the server 200 may acquire the smell pattern information of the noble-fragrance area and generate the smell sensibility pattern of the user.

As another example, the preference may be generated based on usage pattern information of the user accumulated in the process of using the moving object 300. The usage pattern information may include a movement route when a specific passenger rides and may include whether the user who controls driving detoured to the noble-fragrance area on the planned travel route which does not include the area where the specific scent occurs when the passenger rides. In addition, the usage pattern information may include whether the user mainly detoured to the noble-fragrance area when the user moved on the planned travel route predetermined times together with the specific passenger in the past. Upon determining that the user detoured to the noble-fragrance area of the specific smell based on the usage pattern information, the server 200 may acquire the smell pattern information of the noble-fragrance area and generate the smell sensibility pattern of the user.

Referring to FIG. 19 again, the server 200 may check the planned travel route (see 406 of FIG. 10) based on the destination information input through the moving object 300, as shown in FIG. 10, and determine whether the noble-fragrance area (see G of FIG. 10) is included in the vicinity of the planned travel route. FIG. 10 is a view illustrating an example of a detour route of a planned travel route of a moving object. Although, for convenience of description, the server 200 checks the noble-fragrance area according to the planned travel route in the above description, the moving object 300 may perform checking.

When the noble-fragrance area is included in the vicinity of the planned travel route, the server 200 may notify the moving object 300 of the smell-related information. The smell-related information may include the smell information of the noble-fragrance area acquired from another moving object in the past or in real time. As another example, the smell-related information may include zone information affecting the smell of the noble-fragrance area along with the smell information. The smell information may specify the smell type of the noble-fragrance area, and include components and concentrations of the smell of the noble-fragrance area. The smell information may include the diagram of the smell of the noble-fragrance area and may be normalized smell pattern information, similarly to FIG. 8.

The zone information may be information related to a factor which enhances or weakens the smell of the bad-smell area at a planned travel time. For example, the zone information may be climate information and weather information of the noble-fragrance area. The scents of various flowers may be generated in relation to the flower season and weather. The scents of the trees may also be affected by season and weather. Wind may weaken the intensity of the smell, by spreading the scent components to distant areas according to the wind speed. As another example, the zone information may be information indicating whether a facility disposed around the noble-fragrance area is operating. When the facility is a chemical complex or a wastewater treatment plant, the intensity of the smell may depend on whether the factory or treatment plant is operating. The zone information may include, for example, climate and weather information and the facility operation information, but is not limited thereto and may include any information if it is a factor for enhancing or weakening the smell.

The smell-related information may be smell pattern information generated by adding the zone information to the smell information of the noble-fragrance area. For example, when the noble-fragrance area is a specific flower or tree habitat where the scent of the flower or tree is reduced due to a low temperature or rain and the zone information indicates rainy weather, the smell information received in relation to the noble-fragrance area, for example, the concentration value of each component of the smell, may be reduced due to rain. The smell information modified by the zone information may be generated as smell pattern information. The modified smell information may be generated by the server 200 as in this embodiment. As another example, the server 200 may transmit, as the smell-related information, the smell information and the zone information to the moving object 300, and the moving object 300 may calculate the modified smell information to generate smell pattern information.

The moving object 300 may determine the smell sensibility of the user, by comparing a noble-fragrance level based on the smell-related information with the preference of the user related to the smell of the noble-fragrance area.

The moving object 300 may select the smell sensibility pattern of the user corresponding to the preference. For example, when the smell of the noble-fragrance area is a specific tree scent, the smell pattern information of the scent according to sensitivity level 1 may be selected as the smell sensibility pattern corresponding to the preference of the user. The moving object 300 may recognize the smell pattern information calculated from the smell-related information as a noble-fragrance level, and determine whether smell pattern data according to the noble-fragrance level is equal to or greater than pattern data of sensitivity level 1.

As another example, a predetermined learning algorithm or machine learning may be used to compare the smell pattern information received as the noble-fragrance level with the sensitivity level of the smell sensibility pattern. The server 200 may transmit the smell pattern information corresponding to the smell type to the moving object 300, and the moving object 300 may check similarity.

Pattern data most similar to the noble-fragrance level among the smell pattern information, for example, the smell information patterns of a specific tree scent, may be checked and the sensitivity level corresponding to the checked pattern data may be determined. The moving object 300 may determine whether the noble-fragrance level is equal to or greater than the preference of the user, by comparing the noble-fragrance level with the sensitivity levels of the smell sensibility pattern of the user. Therefore, the smell sensibility of the user may be determined based on the bad-smell level of the noble-fragrance area and the personalized preference of the user.

In the above-described embodiment, the moving object 300 determines the preference. In another example, the server 200 may determine the preference and then notify the moving object 300 of a result value.

Subsequently, when the noble-fragrance level is equal to or greater than the preference of the user, the moving object 300 may generate an induction processing message and notify the user of it.

The induction processing message may provide an option to introduce noble fragrance into the moving object 300. For example, the option may include, as shown in FIG. 10, an option for guiding a detour route 408 passing through the noble-fragrance area G in the planned travel route 406 through the route guide 314 or various options for introducing noble fragrance into the moving object 300 when passing through the noble-fragrance area G. The noble-fragrance induction option, for example, the window sealing and inlet opening option by the window driving unit 318 and the air conditioner 316 shown in FIG. 11, may be presented to the user, but is not limited thereto. The options may be, for example, displayed on the display 308 mounted in the moving object 300 to provide an interface capable of selecting an option to the user.

The moving object 300 may recognize that the user has accepted the induction process when the user selects at least one of various options, and perform the induction process according to the selected option. After passing through the noble-fragrance area G, the moving object 300 may release the suppression process of the selected option. For example, window and inlet sealing may be released to prevent introduction of outside air.

When the user does not select an option at all, the moving object 300 may recognize that the user did not accept the induction process and maintain the planned travel route.

When the noble-fragrance level is less than the preference, the moving object 300 may not provide the detour route 408 to maintain the planned travel route 406.

The moving object 300 may present a smell sensibility inquiry message to the user through the display 308 during driving or after the end of use, and receive a response related to the smell and sensitivity from the user.

The smell sensibility inquiry message may include at least one of a smell type or a predetermined point of the driving movement route 406 in relation to the smell inquiry. The smell type may be, for example, a specific smell occurring in the noble-fragrance area G when the user bypassed the noble-fragrance area G having the preference or more or a plurality of other smells. The smell sensibility inquiry message may be presented at a plurality of points on the driving movement route or a touch interface for user position designation may be provided, as shown in FIG. 12. The presented point may be, for example, at least one of the noble-fragrance area having the preference or more on the driving movement route or the noble-fragrance area detected through the smell detector 312 of the moving object 300. When the user selects a point related to the noble-fragrance area, a smell related to the selected noble-fragrance area G may be identified. When the user arbitrarily selects a specific point on the driving movement route, for example, the moving object 300 may present a plurality of smell types to the user, such that the user selects a smell or directly inputs a smell. As another example, the smell of the specific point may be obtained from the history of the smell information obtained from the smell detector 312 of the moving object 300. In addition, the smell sensibility inquiry message may be provided to receive the preference according to the smell or point selected by the user in relation to the sensibility query, as shown in FIG. 12.

Next, the server 200 may check the type of a smell, to which the user's sensitivity is changed, when receiving a response related to the smell and the unpleasantness level from the moving object 300, and the server 200 may analyze and update the smell sensibility pattern of the user.

Figure 20:
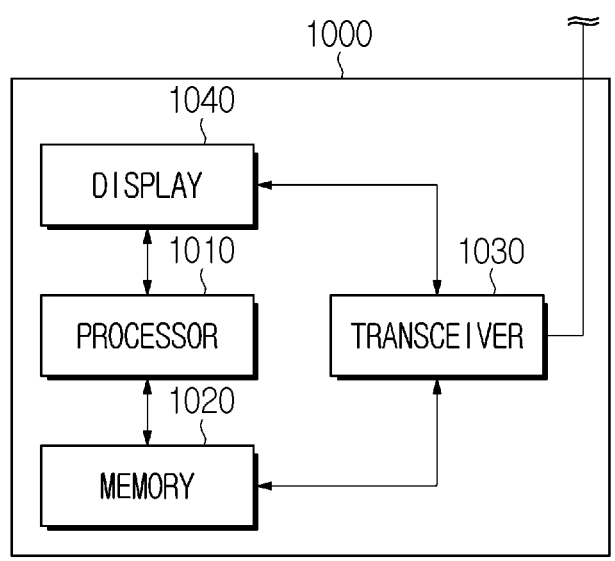
FIG. 20 is a view illustrating the configuration of a device according to an embodiment of the present disclosure.

FIG. 20 is a view illustrating the configuration of a device according to an embodiment of the present disclosure. Referring to FIG. 20, the device may include at least one of the above-described moving object, device, server or RSU. That is, the device may perform communication with another device and may be linked to another device, and is not limited to the above-described embodiment. For example, the device may include at least one of a processor 1010, a memory 1020, a transceiver 1030 or a display 1040 for the above-described operation. That is, the device may include components necessary to perform communication with another device or display a mutual data processing result. In addition, for example, the device may include components other than the above-described components. That is, the device includes the above-described components to perform communication with another device, but is not limited thereto, and may operate based on the above description.

While the exemplary methods of the present disclosure described above are represented as a series of operations for clarity of description, it is not intended to limit the order in which the steps are performed, and the steps may be performed simultaneously or in a different order as necessary. In order to implement the method according to embodiments of the present disclosure, the described steps may further include other steps, may include remaining steps except for some of the steps, or may include other additional steps except for some of the steps.

The various embodiments of the present disclosure are not a list of all possible combinations and are intended to describe representative aspects of embodiments of the present disclosure, and the matters described in the various embodiments may be applied independently or in combination of two or more.

In addition, various embodiments of the present disclosure may be implemented in hardware, firmware, software, or a combination thereof. In the case of implementing embodiments of the present invention by hardware, embodiments of the present disclosure can be implemented with application specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on a device or a computer, a non-transitory computer-readable medium having such software or commands stored thereon and executable on the device or the computer.

What is claimed is:

1. A method of managing smell sensibility according to a route of a moving object, the method comprising:
checking a planned travel route of the moving object;
determining whether a bad-smell area is included in the planned travel route;
determining whether a bad-smell level of the bad-smell area is equal to or greater than an unpleasantness level of a user of the moving object when the bad-smell area is included in the planned travel route; and
performing a suppression process for blocking introduction of a bad smell into the moving object when the bad-smell level is equal to or greater than the unpleasantness level of the user and maintaining the planned travel route when the bad-smell level is less than the unpleasantness level of the user,
wherein the bad-smell area is designated based on smell information collected by a first moving object having a first smell detector between the first moving object having the first smell detector and a second moving object having a second smell detector having lower performance than the first smell detector.

2. The method of claim 1, wherein performing the suppression process includes guiding a detour route of the planned travel route or controlling the moving object to suppress the bad smell when passing through the bad-smell area.

3. The method of claim 1, wherein the unpleasantness level is an unpleasantness level of each of a plurality of smells personalized for each user, and the unpleasantness level is generated based on a smell sensibility pattern comprising a concentration pattern of each component for each of the plurality of smells.

4. The method of claim 3, wherein the unpleasantness level is generated based on a smell sensibility pattern adjusted by the user's sensitivity to each smell, and the smell sensibility pattern includes sensitive smell pattern information of each user calculated by machine learning.

5. The method of claim 1, wherein the bad-smell level is calculated based on smell information and information on a zone affecting a smell of the bad-smell area.

6. The method of claim 1, wherein the moving object includes a smell detector, and wherein the moving object:
analyzes smell information detected through the smell detector;
generates smell-related information based on the smell information when the bad-smell level is equal to or greater than a bad-smell threshold; and
transmits the smell-related information to another moving object or a server.

7. The method of claim 6, wherein smell information collected by the moving object having the second smell detector is converted into smell data processed by machine learning based on the smell information obtained from the moving object having the first smell detector, and a smell sensibility pattern of the user is analyzed based on the smell data or the smell sensibility pattern is generated based on the smell data.

8. The method of claim 1, wherein the moving object having the first smell detector is assigned to the user who has requested a planned travel route different from that of the moving object having the second smell detector.

9. The method of claim 1, wherein the unpleasantness level is generated based on a response message to a smell sensibility inquiry before using the moving object, and the response message includes the user's sensitivity to each of a plurality of smells.

10. The method of claim 1, wherein the unpleasantness level is generated based on a response message to a smell sensibility inquiry after starting to use the moving object, and the response message includes the user's sensitivity to each of a plurality of smells.

11. The method of claim 10, wherein the smell sensibility inquiry includes at least one of a smell type or a predetermined point of a travel route.

12. The method of claim 11, wherein, when the response message includes the predetermined point, the unpleasantness level is generated based on smell information collected or estimated in relation to the predetermined point.

13. The method of claim 1, wherein maintaining the planned travel route when the bad-smell level is less than the unpleasantness level of the user includes controlling the moving object to suppress the bad smell when passing through the bad-smell area based on a selection of the user.

14. The method of claim 1, wherein the bad-smell area includes an ordinary bad-smell area and an accidental bad-smell area, the ordinary bad-smell area has a prestored bad-smell level, and the accidental bad-smell area is accidentally designated when a bad-smell level based on smell information obtained while the moving object moves is equal to or greater than a bad-smell threshold.

15. The method of claim 14, further comprising:
determining whether a bad-smell level of the accidental bad-smell area is equal to or greater than the unpleasantness level of the user of the moving object by the moving object that has obtained the smell information of the accidental bad-smell area;
performing the suppression process when the bad-smell level is equal to or greater than the unpleasantness level of the user and maintaining the planned travel route when the bad-smell level is less than the unpleasantness level of the user; and
transmitting smell-related information of the accidental bad-smell area to another moving object or a server.

16. The method of claim 1, further comprising:
determining whether a noble-fragrance area is included around the planned travel route of the moving object;
determining whether a noble-fragrance level of the noble-fragrance area is equal to or greater than a preference of the user of the moving object, when the noble-fragrance area is included; and
performing an induction process for introducing a noble fragrance into the moving object when the noble-fragrance level of the noble-fragrance area is equal to or greater than the preference of the user and maintaining the planned travel route when the noble-fragrance level is less than the preference of the user.

17. The method of claim 1, further comprising assigning, by a server, the second moving object to a same route as the first moving object based on the second moving object based on the second smell detector having the lower performance than the first smell detector.

18. A moving object for managing smell sensibility according to a route of the moving object, the moving object comprising:
a transceiver configured to transmit and receive a signal; and
a processor configured to:
control the transceiver;
check a planned travel route of the moving object;
when a bad-smell area is included in the planned travel route, determine whether a bad-smell level of the bad-smell area is equal to or greater than an unpleasantness level of a user of the moving object; and
perform a suppression process for blocking introduction of a bad smell into the moving object when the bad-smell level is equal to or greater than the unpleasantness level of the user and maintain the planned travel route when the bad-smell level is less than the unpleasantness level of the user,
wherein the bad-smell area is designated based on smell information collected by a first moving object having a first smell detector between the first moving object having the first smell detector and a second moving object having a second smell detector having lower performance than the first smell detector.

19. A server for managing smell sensibility according to a route of a moving object, the server comprising:
a transceiver configured to transmit and receive a signal; and
a processor configured to:
control the transceiver;
determine whether a bad-smell area is included in a planned travel route of the moving object;
determine whether a bad-smell level of the bad-smell area is equal to or greater than an unpleasantness level of a user of the moving object, when the bad-smell area is included in the planned travel route; and
control setting of the moving object to perform a suppression process for blocking introduction of a bad smell into the moving object when the bad-smell level is equal to or greater than the unpleasantness level of the user and control setting of the moving object to maintain the planned travel route when the bad-smell level is less than the unpleasantness level of the user,
wherein the bad-smell area is designated based on smell information collected by a first moving object having a first smell detector between the first moving object having the first smell detector and a second moving object having a second smell detector having lower performance than the first smell detector.

20. A fleet system implemented by a computing device to perform a smell sensibility management process according to a route of a moving object, the fleet system comprising:
a user device registered in the fleet system;
the moving object registered in the fleet system; and
a server configured to manage the fleet system;
wherein the server or the moving object is configured to:
check a planned travel route of the moving object;
when a bad-smell area is included in the planned travel route, determine whether a bad-smell level of the bad-smell area is equal to or greater than an unpleasantness level of a user of the moving object; and perform a suppression process for blocking introduction of a bad smell into the moving object when the bad-smell level is equal to or greater than the unpleasantness level of the user and maintain the planned travel route when the bad-smell level is less than the unpleasantness level of the user, wherein the bad-smell area is designated based on smell information collected by a first moving object having a first smell detector between the first moving object having the first smell detector and a second moving object having a second smell detector having lower performance than the first smell detector.

\* \* \* \* \*